US007330875B1

(12) United States Patent
Parasnis et al.

(10) Patent No.: US 7,330,875 B1
(45) Date of Patent: Feb. 12, 2008

(54) SYSTEM AND METHOD FOR RECORDING A PRESENTATION FOR ON-DEMAND VIEWING OVER A COMPUTER NETWORK

(75) Inventors: Shashank Mohan Parasnis, Palo Alto, CA (US); Paul C. Poon, San Jose, CA (US); Paul O. Warrin, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/533,049

(22) Filed: Mar. 22, 2000

Related U.S. Application Data

(63) Continuation-in-part of application No. 09/431,678, filed on Nov. 1, 1999, now Pat. No. 6,728,753, which is a continuation-in-part of application No. 09/333,754, filed on Jun. 15, 1999, now Pat. No. 6,636,888.

(51) Int. Cl.
*G06F 15/16* (2006.01)
(52) U.S. Cl. .................. 709/204; 709/203; 709/204; 709/205; 709/208; 709/218; 709/227; 709/228; 709/231
(58) Field of Classification Search ............... 709/231, 709/204, 248, 203, 205, 208, 218, 227, 228
See application file for complete search history.

(56) References Cited

U.S. PATENT DOCUMENTS 5,204,947 A * 4/1993 Bernstein et al. ........... 715/854

(Continued)

OTHER PUBLICATIONS

"Windows Media Services." http://www.microsoft.com/windows2000/server/evaluation/features/media.asp.*

Rutledge, Patrice-Ann; Mucciolo, Tom; Dyck, Timothy; Fuller, Robert; Gilgen, Read; Ulrich, Laurie. "Special Edition: Using Microsoft Powerpoint 2000." Mar. 1999. Mcmillan Computer Publishing.*

(Continued)

*Primary Examiner*—David Wiley
*Assistant Examiner*—Alina Boutah
(74) *Attorney, Agent, or Firm*—Workman Nydegger

(57) ABSTRACT

A system and method for recording and playback of a live presentation that enables a reproduction of audio and visual aspects of the live presentation and enables on-demand viewing of the presentation at a later time. A live presentation comprising a plurality of presentation slides, audio content, and optionally, visual content are recorded as a data stream, so that when the recording of the data stream is played, the presentation slides are displayed in substantial synchrony with reproduced audio and visual content on a viewer's computer, thereby reproducing the live presentation. The plurality of presentation slides are saved as HTML files to a predetermined location that is accessible by the viewer's computer over a computer network, such as the Internet. During the presentation, the live audio and visual content is captured and encoded into the data stream, which is in an active streaming format (ASF), and the data stream is saved to a file. Also, slide display commands produced in conjunction with the display of the presentation slides during the presentation are interleaved into the data stream. In response to a viewer's request to view the presentation at a later time, the data stream file is downloaded to the viewer's computer and played back using a media player, which decodes the data stream file to replicate the live audio and visual content of the presentation. As the slide display commands are encountered during playback of the data stream file, corresponding HTML slide files are downloaded over the computer network to the viewer's computer and displayed so that they are substantially synchronized with the reproduced audio and visual content of the presentation.

28 Claims, 23 Drawing Sheets

U.S. PATENT DOCUMENTS

| | | | | |
|---|---|---|---|---|
| 5,440,677 | A * | 8/1995 | Case et al. | 395/154 |
| 5,446,842 | A * | 8/1995 | Schaeffer et al. | 709/205 |
| 5,727,156 | A * | 3/1998 | Herr-Hoyman et al. | 395/200 |
| 5,822,525 | A * | 10/1998 | Tafoya et al. | 709/204 |
| 5,854,898 | A * | 12/1998 | Riddle | 395/200 |
| 6,108,687 | A * | 8/2000 | Craig | 709/203 |
| 6,144,991 | A * | 11/2000 | England | 709/205 |
| 6,155,840 | A * | 12/2000 | Sallette | 434/323 |
| 6,161,137 | A * | 12/2000 | Ogdon et al. | 709/224 |
| 6,249,281 | B1 * | 6/2001 | Chen et al. | 345/330 |
| 6,314,466 | B1 * | 11/2001 | Agarwal et al. | 709/231 |
| 6,532,218 | B1 * | 3/2003 | Shaffer et al. | 370/260 |
| 6,557,027 | B1 * | 4/2003 | Cragun | 709/204 |
| 6,557,042 | B1 * | 4/2003 | He et al. | 709/231 |
| 6,564,246 | B1 * | 5/2003 | Varma et al. | 709/205 |
| 6,615,239 | B1 * | 9/2003 | Berstis | 709/204 |
| 6,665,835 | B1 * | 12/2003 | Gutfreund et al. | 715/500.1 |
| 6,693,661 | B1 * | 2/2004 | Vanderwilt et al. | 348/14.01 |
| 6,697,569 | B1 * | 2/2004 | Gomez et al. | 386/120 |
| 6,728,753 | B1 * | 4/2004 | Parasnis et al. | 709/203 |
| 2001/0013068 | A1 * | 8/2001 | Klemets et al. | 709/231 |
| 2002/0036694 | A1 * | 3/2002 | Merril | 348/220 |
| 2002/0124100 | A1 * | 9/2002 | Adams | 709/232 |
| 2004/0103372 | A1 * | 5/2004 | Graham | 715/513 |

OTHER PUBLICATIONS

Dyson, Peter. "Mastering Microsoft Internet Information Server 4." 2nd ed. Nov. 1997. Sybex, Inc. Chapter 8.*

Microsoft Office 2000 Resource Kit: Office 2000 and the Web. "Configuring Client computers for Presentation Broadcasting." http://www.microsoft.com/office/ork/2000/five/70t4_4.htm.*

Microsoft Office Resource Kit. "Installing Presentation Broadcasting and Scheduling Broadcasts." http://www-lsu.lboro.ac.uk/staff/manuals/Of2KResKit/five/70t4_2.htm.*

Microsoft Office 2000 Resource Kit. "Using Netshow Services with Presentation Broadcasting." http://www-lsu.lboro.ac.uk/staff/manuals/Of2KResKit/five/70t4_2.htm.*

Microsoft Knowledge Base Article—Q229826. PPT2000: Overview of Online Broadcasting with Netshow.*

"Windows Media Services." http://www.microsoft.com/windows2000/server/evaluation/features/media.asp, Apr. 19, 1999.*

Rutledge, Patrice-Ann; Mucciolo, Tom; Dyck, Timothy; Fuller, Robert; Gilgen, Read; Ulrich, Laurie. "Special Edition: Using Microsoft Powerpoint 2000." Mar. 1999. Mcmillan Computer Publishing.*

Dyson, Peter. "Mastering Microsoft Internet Information Server 4." 2nd ed. Nov. 1997. Sybex, Inc. Chapter 8.*

Microsoft Office 2000 Resource Kit: Office 2000 and the Web. "Configuring Client computers for Presentation Broadcasting." http://www.microsoft.com/office/ork/2000/five/70t4_4.htm, Mar. 22, 1999.*

Microsoft Office Resource Kit. "Installing Presentation Broadcasting and Scheduling Broadcasts." http://www-lsu.lboro.ac.uk/staff/manuals/Of2KResKit/five/70t4_1.htm, published Mar. 5, 1999.*

Microsoft Office 2000 Resource Kit. "Using Netshow Services with Presentation Broadcasting." http://www-lsu.lboro.ac.uk/staff/manuals/Of2KResKit/five/70t4_2.htm, published Mar. 5, 1999.*

Microsoft Knowledge Base Article—Q229826. PPT2000: Overview of Online Broadcasting with Netshow, published Apr. 23, 1999.*

"Office 2000: A Closer Look Power Point 2000." nd. 3pp. Available http://www.techweb.com/winmag/library/1998/preview/office2000d.htm.

Kenny, Cathy. 1998. "PowerPoint 2000, Now Presenting on the Web." Available http://www.pcworld.com/resource/printable/article/0,aid,7770,00.asp.

* cited by examiner

```
┌─────────────────────────────────────────────────────────────┐
│ MICROSOFT NETSHOW NETWORK-MICROSOFT INTERNET EXPLORER  □ □ ⊠│
│ FILE  EDIT  VIEW   GO  FAVORITES   HELP                     │
│  ⇦    ⇨    ⊗    ↻     🏠    ⚲      ▣       ⊙              │
│ BACK FORWARD STOP REFRESH HOME SEARCH FAVORITES HISTORY     │
│ ADDRESS │ HTTP://MSNETSHOW/NETWORK/SUBMITEVENT.HTM  ▼│LINKS │
```

Microsoft
NetShow                    Event Submission
Network

COMPLETE THIS FORM TO OBTAIN COVERAGE OF YOUR EVENT. AFTER SUBMITTING THE EVENT, YOU WILL BE CONTACTED BY A NETSHOW ADMINISTRATOR FOR ADDITIONAL PROGRAMMING INFORMATION BEFORE THE EVENT WILL BE DISPLAYED ON THE NETSHOW NETWORK.

TITLE [ <TITLE> ] ~1102

DESCRIPTION [ <DESCRIPTION> ] ~1104

START DATE/TIME [ ] ~1106
(MM/DD/YY HH:MM AM)
END DATE/TIME [ ] ~1108
(MM/DD/YY HH:MM AM)
RELATED URL [ ] ~1110
(OPTIONAL)
LOCATION [ <LOCATION> ] ~1112
CONTACT'S E-MAIL ALIAS [ <USER'S ALIAS> ] ~1114
CONTENT TYPE  ⦿ LIVE  ○ ON-DEMAND  ○ LIVE WITH SLIDES
1116
[ SUBMIT EVENT REQUEST ]
1122   1118         1120      1100

*FIG. 8*

SYSTEM AND METHOD FOR RECORDING A PRESENTATION FOR ON-DEMAND VIEWING OVER A COMPUTER NETWORK

RELATED APPLICATIONS

This application is a continuation-in-part of U.S. patent application Ser. No. 09/431,678, filed Nov. 1, 1999, now U.S. Pat. No. 6,728,753, entitled "PRESENTATION BROADCASTING," which is a continuation-in-part of U.S. patent application Ser. No. 09/333,754, filed Jun. 15, 1999 now U.S. Pat. No. 6,636,888, entitled "PRESENTATION BROADCAST SCHEDULING," the benefit of the filing dates of which is hereby claimed under 35 U.S.C. § 120.

FIELD OF THE INVENTION

This invention generally concerns recording presentations so that they can be viewed over a computer network, and more particularly, recording and replication of a live presentation that includes both a live portion and a predefined portion for on-demand viewing of the presentation at a time after the presentation has been performed.

BACKGROUND OF THE INVENTION

Online presentation broadcast technology allows people to "attend" a virtual presentation broadcast by broadcasting the presentation over a network to computers that are accessible to the attendees. Recent advancements in networking and online presentation broadcasting technology have led to a rapid increase in the use of such virtual presentation broadcasts, particularly over intranets within large corporations. Of course, the advantages of virtual presentation broadcasts are perhaps best realized over the Internet, which can reach an even greater audience. While these advancements have been dramatic, the ease of use in presenting and receiving such broadcasts have not kept pace.

A typical online broadcast of a presentation is performed in the following manner. A presentation designer, or design team, creates a presentation, which typically comprises a plurality of slides, including text and/or graphic content. The presenter then conducts a "live" performance of the presentation, which is recorded using one or more video cameras with microphones. The recorded presentation generally consists of video and audio content that is recorded on a magnetic tape media using an analog encoding format. For example, conventional television signals are encoded using one of three standard formats: National Television System Committee (NTSC—used in North America), Phase Alternating Line (PAL), or Sequential Color and Memory (SECAM). These standards define encoding schemes for mechanisms that can be used to encode and/or decode analog audio and video broadcasts or tape recordings. For instance, a camcorder designed for use in the United States will encode video and audio content using the NTSC analog format, so that the recorded video and audio content can be viewed on a conventional television when it is played on the camcorder (or other playback equipment).

Although the foregoing analog recording technology and encoding formats have worked well for many years, recordings that use these formats cannot be directly used to transmit audio and/or video content via an online broadcast, since computer networks cannot transfer content that is in an analog format. This problem is addressed by using special audio and video "capture" equipment, which converts the analog signals produced by audio and video recording (and broadcasting) equipment into a digital format, using a special type of encoding scheme and/or device called a codec. The term codec, which is an abbreviated form of coder/decoder, actually originated in the field of analog communications. NTSC, PAL, and SECAM are examples of analog codecs used in television broadcasting.

Through use of one or more codecs, the capture equipment converts an analog recording (or original broadcast signal) into a digital format in the following manner. Typically, the recording is converted into a digital format by using a computer that includes one or more audio and/or video capture cards that receive an analog signal produced by the playback equipment (or which is directly produced by equipment such as a microphone or television broadcast camera) during the live presentation and converts it into a digital format using a particular codec that the cards are designed to implement. Such cards generally employ a special chip that is programmed with logic for converting an input analog signal to an encoded digital signal of a predetermined format, preferably in real-time.

Under Microsoft Corporation's WINDOWS™ operating systems, codecs are usually implemented to be ACM (Audio Compression Manager) or VCM (Video Compression Manager) compatible, so that the output of the codecs can be directly read and used by ACM and VCM compatible software. Various ACM and VCM compatible codecs are used to produce audio and/or video content in several different formats, including file formats related to the extensions .wav, .avi, and .mov, as well as MPEG and MP3 formats.

Once the audio and/or video content of the presentation is converted into an appropriate digital format, it can be sent to an online audience. In the past, this task has been done after a request from each audience member causes the file or files comprising the content of the presentation to be downloaded to their own computers. Once the file is downloaded, the presentation can be viewed by "playing" the file with an appropriate codec player, such as Microsoft Corporation's WINDOWS MEDIA PLAYER™, or the QUICKTIME™ player developed by the Apple Computer Corporation. In order to view a presentation in this manner, it is necessary that the appropriate player be already installed on the viewer's computer.

In addition to viewing presentations in the foregoing manner, recent advancements in streaming format technology have made it possible to receive audio and video content via live broadcasts over the Internet and other network environments. As opposed to conventional network file transfer schemes, streaming format technology allows content to be continuously "streamed" to one or more computers over a network rather than being first downloaded as a file. A typical example illustrating the use of streaming format technology is a live Internet concert, in which audio and video equipment at the performance site produce signals that are converted into a digital format in real- or near real-time (or are already in a digital format if digital camera equipment is used), and the digital content is converted into an appropriate streaming format and broadcast to a large audience accessing the concert via an Internet Web page. In addition to concerts, streaming technology is presently used for broadcasting other types of live events, including presentations.

Although the foregoing schemes have greatly advanced the use of online broadcasting, they have significant drawbacks when they are used for broadcasting an online presentation. Notably, when employing either of these methods, the screen area occupied by the video image seen by the online audience is quite small, often making the content of the presentation, especially presentation slides, difficult to view. The relatively small size of the video image is generally due to bandwidth and compression technology limitations, as well as quality considerations. For example, a video frame update rate of 30 frames per second (fps) is generally believed to be the minimum acceptable frame rate for rendering objects that move at a medium rate of motion, such as a person giving a live presentation. In addition, 30 fps is the accepted rate in the NTSC television standard, so most people are accustomed to viewing video content at this frame rate. Suppose the maximum bandwidth connection available to a person in the audience viewing a presentation is 28.8 Kilobits per second (Kbps). In order to maintain a frame rate of 30 fps under this data bandwidth, the video content and audio content of the presentation should be divided into 22 Kbps and 6 Kbps portions, respectively. Under Microsoft Corporation's WINDOWS™ media technology, the 22 Kbps video content portion corresponds to a 22 Kilobit WINDOWS™ media encoder template that produces a video image of only 160×120 pixels, while the audio content portion is encoded by an appropriate codec as a monophonic audio signal at 6 Kbps (corresponding to a sampling rate of 8 KHz). When displayed on many of today's computer monitors, which typically provide a display resolution of 1024×768 pixels or greater, a video image of 160×120 pixels only occupies a small portion of the monitor's available display area. Therefore, a presentation slide that was originally intended to use a monitor's entire display area will be difficult, if not impossible, to be clearly viewed or read on the recipient's monitor. Accordingly, a live presentation broadcast that produces such a small video image will be of little value to most audience members.

A similar problem exists when viewing a presentation that is enabled through the use of downloaded files. In order to conserve file size, as well as for other reasons, the display area of an image in a video media player is again generally only a fraction of the total display area of a monitor. As a result, this method also does not adequately display presentation slide images.

Although online broadcasting of live events such as presentations allows an audience to attend the event from remote locations, other people who would like to attend the presentation (either in person or remotely) may be prevented from doing so because of scheduling conflicts. Accordingly, it would be advantageous to enable such people to view the presentation at a later time, preferably when their schedule permits. As discussed above, content corresponding to the live portion of the event (e.g., presentation) can be captured and encoded into a streaming format and broadcast over a network to a remote audience. In addition, the live content of the event can be recorded for later playback by simply saving the data stream produced by the encoder to a file as it is produced. The recorded content file can then be distributed to end users via a network transfer of the file or a physical distribution of the file on a CD-ROM or floppy disk. The live content can then be replicated on a viewer's computer by simply playing back the file using a suitable multimedia player. Internet news services frequently employ this scheme by using playback files that can be downloaded and played to replicate live content, such as the audio portion of a reporter's interview, or replay of an important portion of a news or sporting event.

This scheme works well for recording and replicating most live events. However, since presentations generally include a slide show content comprising a plurality of presentation slides in addition to live content, it is desirable to replicate both the slide show content and the live content in a manner that enables the viewer to perceive the full content of the original presentation. Ideally, an acceptable solution to this problem should produce a composite display image comprising a portion of a viewer's display screen on which visual aspects of a live presentation are replicated, and another (preferably larger) portion of the display screen on which the slide show content is replicated, thereby enabling the viewer to clearly see the presentation slides. At the same time, the system should replicate the audio content of the presentation through the viewer computer's sound system, and the audio, video, and slide show content should all be synchronized, just as in the original presentation.

At present, there is no automated scheme for producing this result. Using conventional methods, this result is achieved by manually adding synchronization calls for displaying and/or animating the various slides in the slide show and linking to the various slide image source files. This manual process is rather tedious and prone to error. Accordingly, it would be desirable to provide an automated method for embedding the synchronization calls and links in the streaming format file so that when the file is played, the full content of the live presentation is replicated in synchrony just as in the original presentation.

Another problem with the prior art scheme is that the links to the slide files typically are absolute, such as a URL address in the form "http://<network domain><directory path>/slidename." A drawback of this scheme is that it makes it difficult to move slide files and streaming files corresponding to an archived recording of a presentation. If the files are moved, all of the links have to be updated. Accordingly, it would be advantageous to provide a scheme that allows the recording files to be moved without requiring that the embedded links be updated.

SUMMARY OF THE INVENTION

The present invention addresses many of the shortcomings associated with conventional presentation recording schemes by providing a system and method for recording and playback of a live presentation that produces a replication of audio and visual aspects of the live presentation and enables on-demand viewing of the presentation over a computer network. The system comprises an integrated environment that leverages many of the features of Microsoft Corporation's POWERPOINT 2000™ presentation design application program to enable a presenter to record a presentation so that it may be selectively viewed upon request by an online viewer over a computer network, such as an intranet or the Internet. The system enables a live presentation comprising a plurality of presentation slides, and audio and optionally, a visual content to be recorded so that when the recording is played, the presentation slides are displayed in substantial synchrony with the replicated audio and visual content on the viewer's computer, thereby reproducing the audio and visual aspects of the live presentation. Furthermore, the synchronization calls and links to the slide files are automatically added during the recording process, and the links are referenced in a manner that enables the slide files to be moved without requiring the links to be changed.

According to a first aspect of the invention, a method is provided for recording a live presentation having a predefined content portion, including a plurality of presentation slides that are displayed in response to slide triggering events during the live presentation, and a live portion comprising live audio and/or visual content performed in conjunction with the display of the plurality of presentation slides during the live presentation. In some instances, the live content will comprise an audio narrative provided by a presenter during the presentation. In other instances, the live content will also comprise visual aspects of the presentation, such as a view of the presenter during the live presentation. These visual aspects are replicated during playback of the recording on the viewer's computer, thereby enhancing the viewing experience. During the presentation, the live audio and/or visual content is captured, digitized, and encoded into a data stream, preferably using an active streaming format (ASF), and the data stream is saved to a file. In response to the slide triggering events, slide display commands comprising HTML script commands for controlling display of the presentation slides during playback of the recording are generated. These slide triggering events are automatically embedded into the data stream in an interleaved fashion such that when the data stream file is played back on an appropriate media player (preferably Microsoft Corporation's WINDOWS™ Media Player), the live portion of the presentation is replicated in a portion of the viewer's display, and the presentation slides are displayed in substantial synchrony with the live portion on another portion of the viewer's display, thereby replicating the live presentation.

When the presentation comprises live visual content, the visual content is captured as a plurality of video frames, each being encoded into the data stream with a timestamp corresponding to a time when that video frame was captured. Accordingly, since the slide display commands are interleaved into the data stream, each slide display command will have an inherent timestamp based on the timestamps of proximate encoded video frames. During the encoding process, certain video frames will be encoded as keyframes, while the majority of the video frames will comprise deltaframes. Keyframes are video frames that comprise new data, while deltaframes comprise data corresponding to the difference between a current frame and its immediately preceding frame. Preferably, each slide display command will be indexed to a nearest preceding keyframe, using the following steps. First, a time index comprising a plurality of time index values will be added to the data stream, preferably with a one-second granularity or resolution. The keyframes will then be indexed to corresponding time index values based on each keyframe's timestamp. The slide display commands will then be indexed to a nearest preceding keyframe index value based on each slide display command's inherent timestamp.

According to another aspect of the invention, the method enables files comprising a recorded presentation to be moved without requiring that the embedded links to those files be updated. The plurality of presentation slides are saved as HTML slide files to a predetermined location that is accessible to the viewer's computer via the computer network. Accordingly, at least a portion of the slide display commands (those commands that request that a new slide be displayed) will include a URL reference (i.e., a link) to the location of a corresponding HTML slide file. Preferably, when the slide display commands are generated, each URL reference will comprise an absolute reference to the location of the command's corresponding HTML slide file, and the absolute reference will include a base portion identifying a base directory on a network resource in or below that where the HTML slide files are stored, and a relative portion, identifying a location at which the HTML slide files are stored relative to the base directory. In response to a viewer's request to view the recorded presentation, the data stream file is downloaded to the viewer's computer via a browser application program, and played back using the media player, which decodes the data stream file to replicate the live audio and visual content of the presentation. At about this same time, the location of the base directory is passed to the browser application program. As the slide display commands are encountered during playback, the URL references are parsed to identify the relative portion of references. Appropriate HTML slide files are then downloaded over the computer network to the browser based on these relative references. By using this relative referencing scheme, the HTML slide files and the data stream file can be moved to or below a new base directory as long as their relative location to that new base directory is maintained and the location of the new base directory is passed to the browser.

According to yet another aspect of the present invention, a system for implementing the recording of a presentation is provided. In a first preferred configuration, the system comprises a presentation computer that is running the POWERPOINT 2000™ application program. During the presentation, a presenter advances through the plurality of presentation slides by issuing slide triggering events to the POWERPOINT 2000™ program. In response to the slide triggering events, successive slides in the presentation are displayed and/or animated, and slide display commands for triggering a synchronized display and/or animation on the receiving computers are generated. Preferably, the presentation computer also includes an audio capture subsystem, such as a high-performance sound card (or embedded sound system) connected to a microphone, so that the live audio aspect of the presentation is captured and processed, producing a corresponding digital audio signal. This digital audio signal, along with the slide display commands, is encoded into an ASF stream in the manner discussed above through use of an encoding module (i.e., WINDOWS™ Media Encoder) running on the presentation computer, which appends data corresponding to the ASF stream to a file that is used to record the presentation.

The foregoing system configuration may also include a video capture subsystem comprising a video camera and video capture circuit for producing a digital video signal corresponding to visual aspects of the presentation. The digital video signal is encoded into the ASF stream along with the digital audio signal, so that visual aspects of the presentation are replicated on the receiving computers.

A second preferred configuration of the system adds an encoding computer to the configuration of the preceding embodiment, so that the encoding computer is linked in communication with the presentation computer. Preferably, the encoding computer includes audio and video capture cards, which are respectively connected to a microphone and video camera for capturing live audio and visual aspects of the presentation. In this configuration, the encoding module is running on the encoding computer and encodes the digital video and audio signals produced by the audio and video capture cards into the ASF stream. In addition, the slide display commands are sent from the local computer to the encoding computer, and the encoding module interleaves the slide display commands into the ASF stream, as discussed above.

According to still another aspect of the invention, a computer-readable medium is provided that includes computer-readable instructions for performing the steps of the method, generally as described above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIG. 8 is a representation broadcast of a web page that includes presentation broadcast schedule information;

DESCRIPTION OF THE PREFERRED EMBODIMENT

The present invention addresses many of the problems associated with conventional online presentation broadcasting schemes by providing an integrated environment that enables an audience member to view the entire content of an original presentation. Furthermore, the environment enables a presenter to give a "live" presentation to a large audience over the Internet or over an intranet, so that minimal user intervention is required by the presenter to broadcast the live presentation. With reference to an exemplary operating environment discussed below, a broadcast of an online presentation is performed (from a presenter's viewpoint) entirely from within a presentation broadcast design application program that is executed on the user's local computer. The presentation broadcast design application is used to create, set up, schedule, and broadcast the presentation broadcast. The user enters information concerning the presentation broadcast while working within the presentation broadcast design application, providing specific details such as where presentation files are to be stored, and a URL or address where viewers can "attend" the presentation. Once this information is entered and the appropriate computer and audio and/or video equipment is set up, a live broadcast of the presentation can be performed, transmitted over the network, and received by an online audience. In addition, the presentation may be recorded so as to enable on-demand online viewing of the presentation at a later time after the presentation has been performed.

A preferred embodiment of the present invention employs several application programs that are installed on the local computer that is used to create, schedule, and broadcast the presentation broadcast. These programs include Microsoft Corporation's POWERPOINT 2000™ and INTERNET EXPLORER 4.0™ (or later versions thereof), both of which run under Microsoft Corporation's WINDOWS™ operating systems, such as WINDOWS 98™, WINDOWS NT™, and WINDOWS 2000™. Preferably, the remote computers of the online presentation attendees will also be running one of Microsoft Corporation's WINDOWS™ operating systems, as well as its INTERNET EXPLORER browser application program. In addition, the local computer is preferably in communication with another computer running Microsoft Corporation's NETSHOW™ server program.

Exemplary Operating Environment

Figure 25:
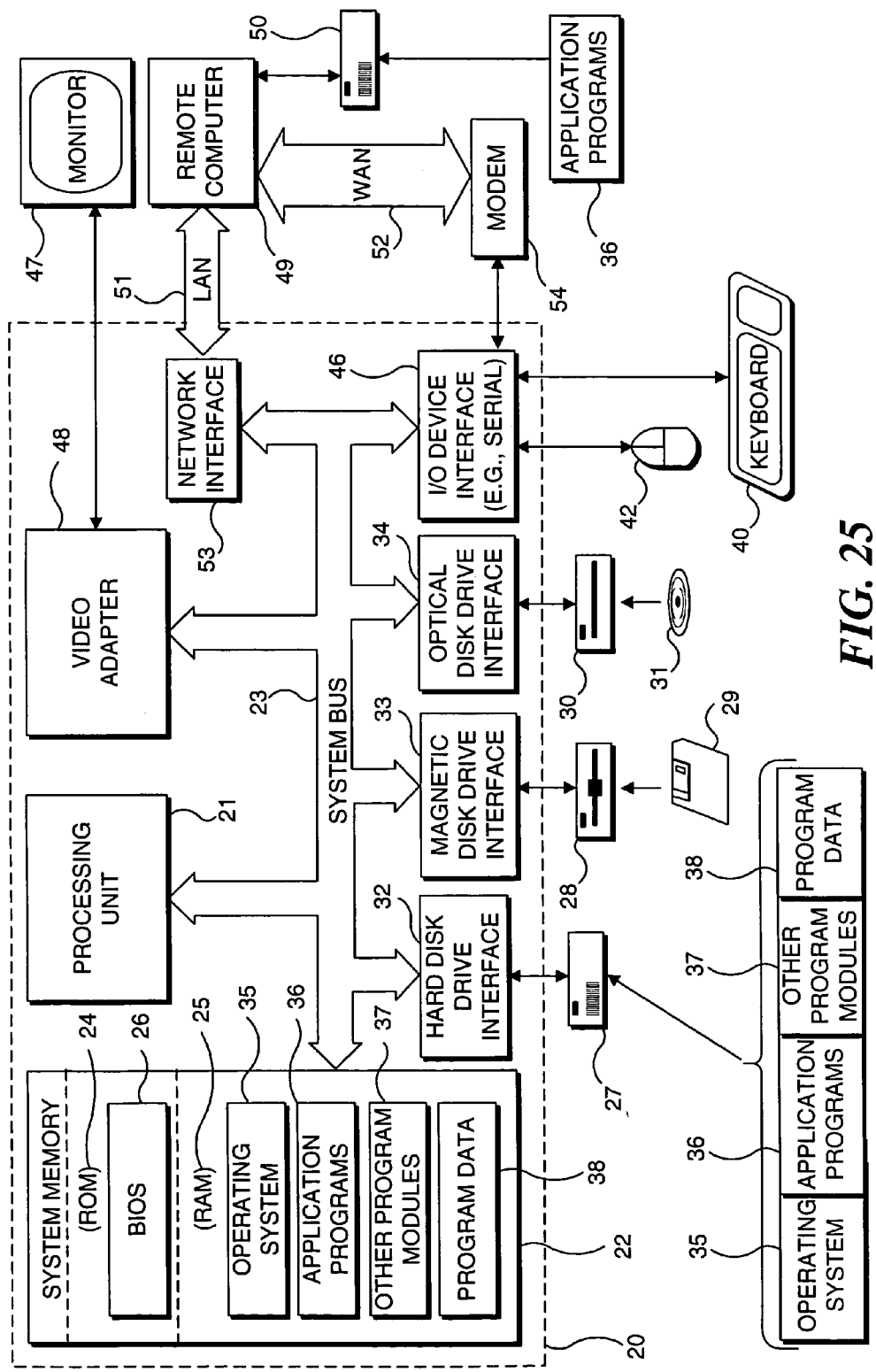
FIG. 25 is a schematic block diagram illustrating an exemplary computer system usable for practicing the present invention.

FIG. 25 and the following discussion are intended to provide a brief, general description of a suitable computing environment in which the invention may be implemented. The foregoing application programs (Microsoft Corporation's POWERPOINT 2000™, INTERNET EXPLORER™, and NETSHOW™ server) comprise a plurality of program modules, including routines, executable files, library files, objects, components, data structures, etc., that perform particular tasks or implement particular abstract data types. Moreover, those skilled in the art will appreciate that the present invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 25, an exemplary system for implementing the present invention includes a general purpose computing device in the form of a conventional personal computer 20, including a processing unit 21, a system memory 22, and a system bus 23 that couples various system components including the system memory to processing unit 21. System bus 23 may be any of several types of bus structures including a memory bus or memory controller, a peripheral bus, and a local bus using any of a variety of bus architectures. The system memory includes a read only memory (ROM) 24 and random access memory (RAM) 25. A basic input/output system (BIOS) 26 contains basic routines that help to transfer information between elements within personal computer 20, such as during start-up, and is stored in ROM 24. Personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31, such as a CD-ROM or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules, and other data for personal computer 20. Although the exemplary environment described herein employs hard disk 27, a removable magnetic disk 29, and a removable optical disk 31, it should be appreciated by those skilled in the art that other types of computer-readable media which can store data that are accessible by a computer, such as magnetic cassettes, flash memory cards, digital video disks, Bernoulli cartridges, RAMs, ROMs, and the like, may also be used in the exemplary operating environment.

A number of program modules may be stored on hard disk 27, magnetic disk 29, optical disk 31, ROM 24, or RAM 25, including an operating system 35, one or more application programs 36, other program modules 37, and program data 38. A user may enter commands and information into personal computer 20 through input devices such as a keyboard 40 and a pointing device 42. Other input devices (not shown) may include a microphone, joystick, game pad, satellite dish, scanner, or the like. These and other input devices are often connected to processing unit 21 through a serial port interface 46 that is coupled to the system bus, but may be connected by other interfaces, such as a parallel port, game port, an IEEE 1394 (Firewire) port, or a universal serial bus (USB). A monitor 47 or other type of display device is also connected to system bus 23 via an interface, such as a video adapter 48. In addition to the monitor, personal computers typically include other peripheral output devices (not shown), such as speakers and printers.

During an online broadcast of a presentation, a portion of the presentation content will originate from a computer, such as personal computer 20, which is used to present the slides of the presentation. Preferably, this content will be transmitted over a computer network to one or more remote computers, such as a remote computer 49. Remote computer 49 may be another personal computer, a server, a router, a network PC, a peer device, or other common network node, and typically includes many or all of the elements described above in regard to personal computer 20, although only a memory storage device 50 has been illustrated in FIG. 25. The logical connections depicted in FIG. 25 include a LAN 51 and a wide area network (WAN) 52; such networking environments are commonplace in offices, enterprise-wide computer networks, intranets, and the Internet.

When used in a LAN networking environment, personal computer 20 is connected to LAN 51 through a network interface or adapter 53. When used in a WAN networking environment, personal computer 20 typically includes a modem 54 or other data interface device for establishing communications over WAN 52 or over the Internet. Modem 54, which may be internal or external, is connected to system bus 23 via serial port interface 46, but may be connected through the bus or through another type of port. In a networked environment, program modules executed by personal computer 20, or portions thereof, may be stored in the remote memory storage device. It will be appreciated that the network connections shown are exemplary and other suitable means for establishing a communications link between the computers may be used, as will be apparent to those of ordinary skill in the art.

In order to perform a presentation broadcast, it is first necessary to design the presentation. Typically, a presenter or a design team (or other person(s) assigned to the task) will design a presentation comprising one or more slides, using the POWERPOINT 2000™ presentation broadcast design application (hereinafter referred to simply as "POWERPOINT"). POWERPOINT provides a rich array of features for designing presentations, including various predefined design and presentation templates. In addition, POWERPOINT allows several predefined slide animations to be used, including fly-ins, wipes, and dissolves. The process of designing a presentation with POWERPOINT is well known to those of ordinary skill in the art; therefore, further details of the process are not provided herein.

Setting Up and Scheduling a Presentation Broadcast

Figure 1:
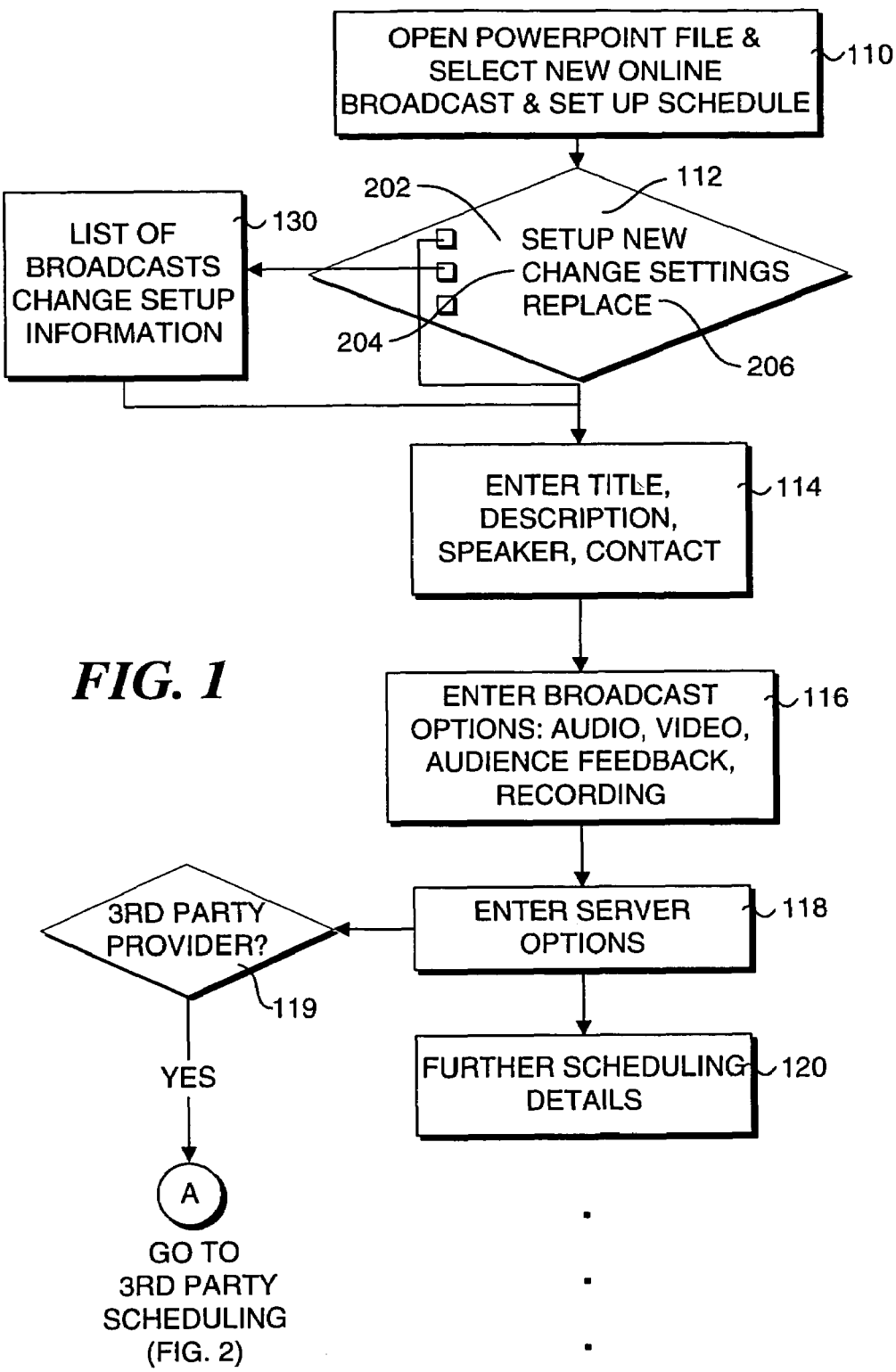
FIG. 1 is a flowchart illustrating the logic used in a preferred embodiment of the present invention when scheduling a presentation broadcast.

In order to perform an online presentation broadcast, the broadcast must first be set up and scheduled. The process for setting up and scheduling a presentation broadcast is described below with reference to the logic illustrated in the flowchart of FIG. 1, in conjunction with various dialog boxes shown in FIGS. 3-8. Referring to FIG. 1, the set up and scheduling process begins in a block 110, wherein a user opens an existing presentation document (or creates a new presentation document) in the POWERPOINT application. As discussed above, the presentation document includes one or more slides or pages the user wishes to broadcast to an online audience at a future date and time. The user initiates the set up and scheduling of an online presentation broadcast by activating the "Slide Show" top menu item and selecting the "Online Broadcast→Set up and Schedule" menu option. The flowchart logic then proceeds to a decision block 112, which displays a schedule presentation broadcast dialog 200 (shown in FIG. 3). Decision block 112 presents three options, including a "setup new" option 202, a "change settings or reschedule" option 204, and a "replace a file scheduled for broadcast" option 206. These options are also included in schedule presentation broadcast dialog 200, and may be accessed by activating one of their respective associated radio buttons 203, 205, and 207.

Selecting setup new option 202 enables the user to set up and schedule a new presentation broadcast. Selecting change settings option 204 enables the user to change the settings of a currently-scheduled presentation broadcast, including rescheduling the time(s) of the presentation broadcast. This option is disabled if the presentation broadcast has not been scheduled. Selecting replace scheduled presentation broadcast option 206 enables the user to select a previously scheduled presentation broadcast and replace its presentation broadcast file with the presentation broadcast file of the presentation broadcast on which the user is currently working. Activating a "tips for broadcast" button 210 launches an assistant with help on presentation broadcasting. The assistant provides information concerning the scheduling and issuance of a presentation broadcast, including frequently asked questions (FAQs), presentation tips, and limitations of the process. It is possible that expert users may turn off have the assistant, in which case the "tips for presentation broadcast button" will be disabled or grayed.

Figure 3:
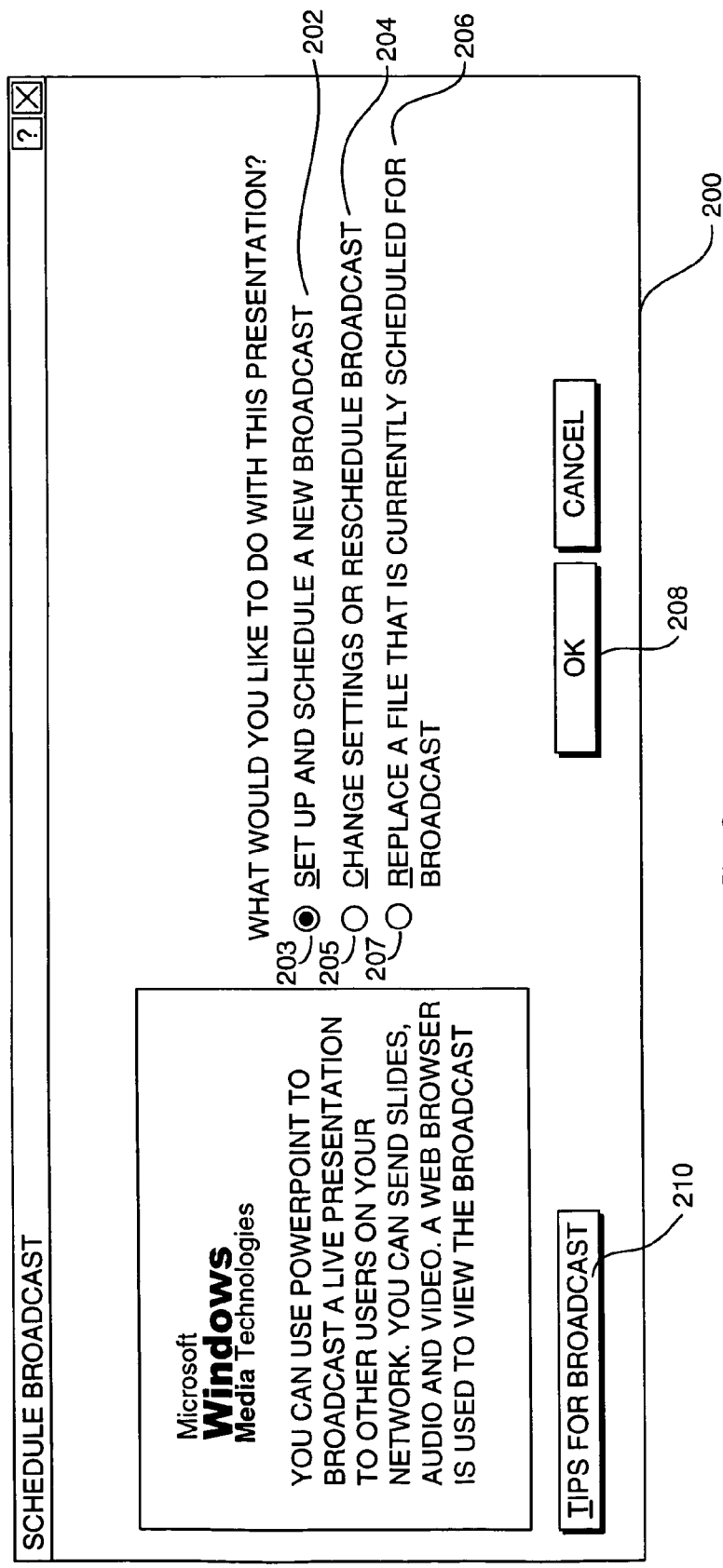
FIG. 3 is a dialog illustrating options that enable a user to schedule, reschedule, change, or replace a presentation broadcast in accord with one embodiment of the present invention.
Figure 4:
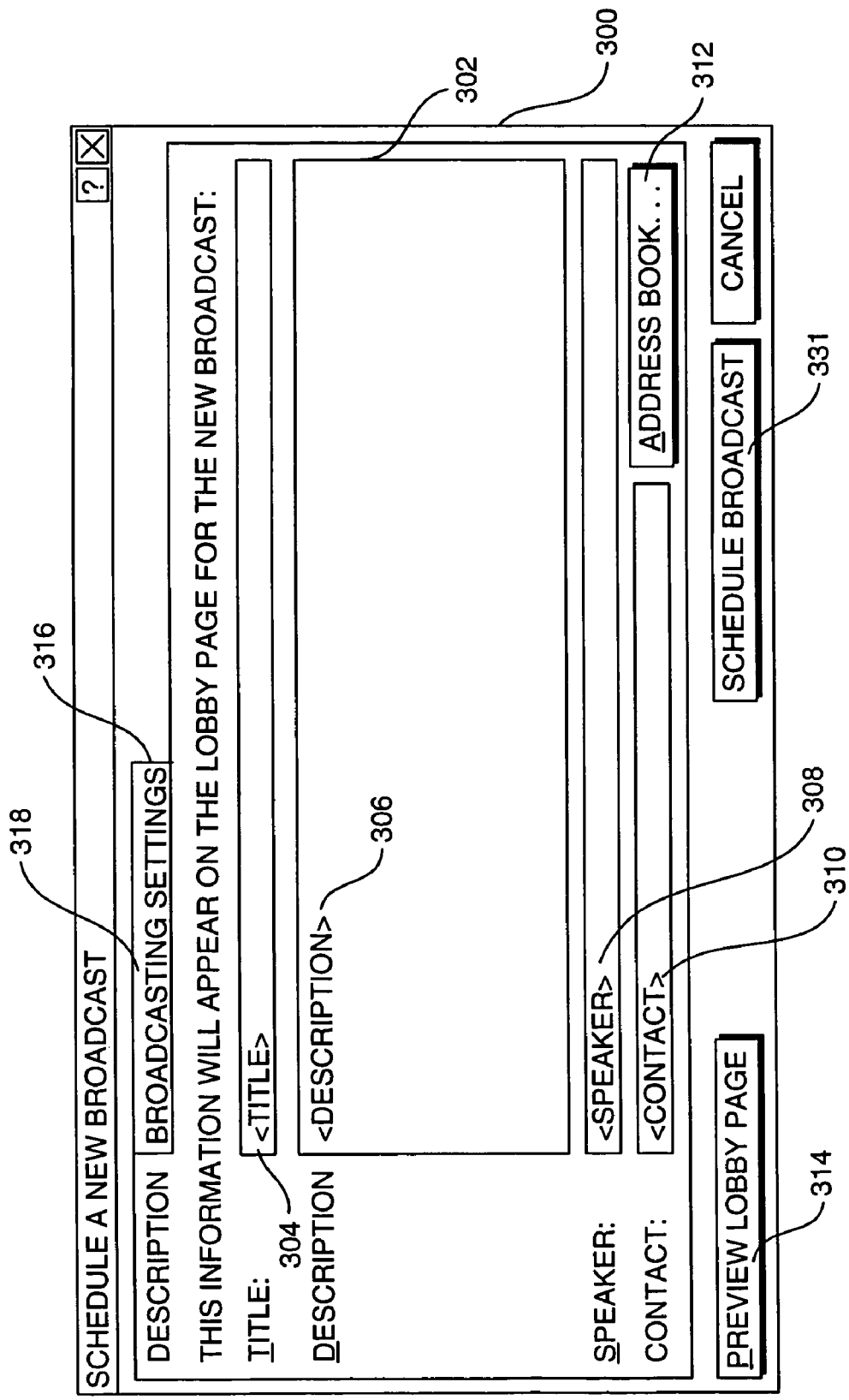
FIG. 4 is a dialog for entering a description and other information for a presentation broadcast.

To set up and schedule a new presentation broadcast, the user selects setup new option 202 and activates an OK button 208 as shown in FIG. 3, by either clicking on it while it is selected with a cursor using an input device such as a mouse, or activating the enter key on a keyboard when the OK button is highlighted (which occurs when one of the radio buttons 203, 205, or 207 is selected). This selection causes the logic to proceed to a block 114 in FIG. 1, which brings up a schedule information dialog 300, as shown in FIG. 4. With reference to FIG. 4, the user preferably first enters information concerning the presentation broadcast in appropriate fields of dialog 300. For example, the user would enter a title 304, a description 306 in a description form box 302, identify a speaker (or author) 308, and a contact 310.

The information entered into description form box 302 is subsequently used to automatically populate a "lobby" page and other tabs or pages used for scheduling purposes. The lobby page is a network page that is preferably browsed by online attendees prior to the start of the presentation broadcast so that the slide show content of the presentation can be downloaded to the attendees' computers and cached prior to the start of the presentation. The lobby page contains special controls for downloading such presentation content, as further described below, and also provides attendees with a summary of information concerning the presentation broadcast to enable each attendee to decide whether to attend (view) the presentation broadcast.

The default title entered for title 304 will be the name of the presentation broadcast that is currently active in POWERPOINT. The description field will preferably contain information that informs the viewers about the subject of the presentation broadcast, and may include an overview and/or agenda, an indication of where more information may be obtained, and other relevant data. The default speaker name and contact entered automatically will be the name and e-mail address of the current user running POWERPOINT. Any of the default information that is automatically entered can of course be changed by the user, as appropriate. In addition, the user can activate an address book button 312 to open an address book in Microsoft Corporation's OUTLOOK 2000™ program and select contacts from among the entries in the address book, to provide the e-mail addresses of the prospective attendees, or may manually enter an e-mail address for any prospective attendee.

If the user selects a preview lobby page button 314, the display focus will be switched to the browser (i.e., Microsoft Corporation's INTERNET EXPLORER™ browser program), or the browser will be opened if it is not already open, and a lobby page will be created in a temporary directory and displayed on the browser. The preview lobby page button is used to illustrate how the presentation broadcast lobby page will appear when an attendee browses the page prior to the start of the presentation. In addition to the pre-populated information from the description form, the lobby page contains additional information, such as the start and end times (and dates) of the presentation broadcast (entered below). Since no time and date information has been entered at this point, the values for start and end times will be blank if the lobby page is previewed at this stage of the process.

Figure 5:
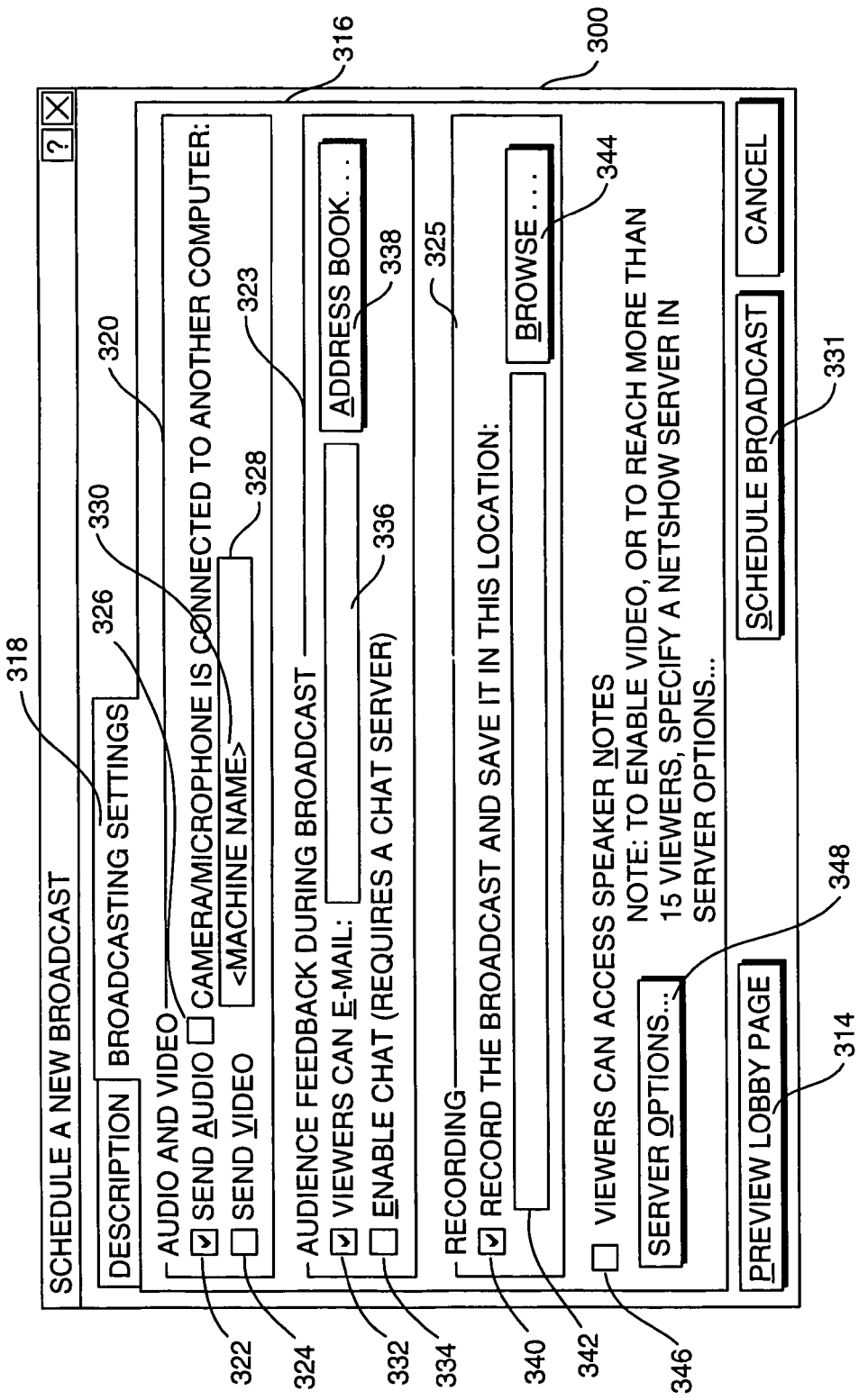
FIG. 5 is a dialog displaying exemplary presentation broadcast information.

Next, the logic flows to a block 116 (FIG. 1), which provides for entering information into a presentation broadcasting settings form 316, as shown in FIG. 5. The user selects a presentation broadcast settings tab 318 to switch the focus from description form 302 to the presentation broadcast settings form. The presentation broadcast settings form enables the user to select or enter advanced settings, such as selectively determining whether audio and/or video will be transmitted during the presentation broadcast, determining whether and where the presentation broadcast will be archived, and specifying an audience feedback mechanism, etc. For organizations that want to monitor the network bandwidth required for such events, the administrator can selectively allow/disallow audio or video, limit bandwidth settings, and enable archiving on a per individual basis. This information is thereby provided to POWERPOINT so that the appropriate controls on the presentation broadcasting settings form are properly enabled or disabled. If willing to accept the default presentation broadcast setting (audio only), the user need not open the presentation broadcasting settings form. The presentation broadcasting settings form includes several other sections, including an audio and video section 320, an audience feedback section 323, and a recording section 325.

In the audio and video section, the user enters information identifying the type of media that is to be included in the presentation broadcast and the computer from where the presentation broadcast will be transmitted over the network. Audio and video section 320 includes a send audio checkbox control 322, a send video checkbox control 324, and a camera/microphone checkbox control 326, which has an associated machine name edit field 328. The default is to include a check in send audio checkbox control 322 and for both send video checkbox control 324 and camera/microphone checkbox control 326 to be unchecked. To send audio, the user's local computer must have a sound card with a microphone plugged into it. To send video, the user will need a video camera that is connected to a video capture board in the computer or some other appropriate video input device/port.

If both of the send video checkbox control and the camera/microphone checkbox controls are unchecked, then the NETSHOW buffer time should be reduced to 0 seconds, or as low as possible, assuming that a telephonic connection (i.e., an analog modem) is being used for transmitting the presentation broadcast over the network. (NETSHOW parameters such as the buffer time may be adjusted externally of POWERPOINT by the user or a network administrator.)

Camera/microphone checkbox control 326 is only enabled if at least one of the send audio or the send video checkboxes is checked. This checkbox is used if the presentation broadcast is to be a live presentation broadcast that requires a camera (for video content) and/or a microphone (for audio content) connected to another computer. If a camera and/or microphone is used, a machine name 330 must be entered into machine name field 328, which is only enabled if the camera/microphone checkbox control is checked. The machine name identifies the computer to which the camera and/or microphone is connected. The default for the machine name is taken from the operating system registry. If there is no registry entry, then the name of the computer currently being used for the indicated purpose should be entered. Preferably, the machine corresponding to the entered machine name should be pinged to make sure that a valid name has been specified. The pinging test is carried out when the user presses a schedule presentation broadcast button 331 (see below). If the name cannot be thus validated, a modeless dialog box (not shown here) is displayed, containing the alert: "Could not find the computer named '<machine name>'." In this case, the computer that was identified in machine name field 328 may not be currently connected to the network, or the name or location may be incorrect. If the computer name is incorrect, scheduling will stop, and the user will be returned to the scheduling dialog with the focus on the machine name field 328.

The audience feedback section allows the user to specify how (or if) the audience can communicate with the user during or after the presentation broadcast. The most common means of communication is through e-mail. Optionally, the user can set up an IRC-compatible chat server, such as a Microsoft Corporation EXCHANGE™ chat server, which will enable the user and audience members to interactively communicate during the presentation broadcast.

The audience feedback section 322 comprises an e-mail checkbox control 332, and an enable chat checkbox control 334. The e-mail checkbox control also has an associated e-mail edit field 336. Viewers of the presentation broadcast are enabled to e-mail feedback during (or after) the presentation broadcast, or send and receive chat messages during the presentation broadcast if the user selects respective checkbox controls 332 and 334. The default is for both the e-mail checkbox control and the chat checkbox control to be unchecked. If the user checks the e-mail checkbox control, a default e-mail address reference for the current user is automatically entered into e-mail field 336, but can be changed by the user. Choosing an address book button 338 will automatically check (validate) the value entered into the e-mail field to determine if it is a valid address. If no value is entered (or if the entered value cannot be validated), the user's address book in OUTLOOK 2000™ will be opened to enable the user to select an e-mail address stored in the address book. If the user doesn't validate the e-mail entry with the OUTLOOK 2000™ address book, it will be verified when the user presses schedule presentation broadcast button 331. If the entry cannot be validated, an alert (not shown) is displayed to inform the user of this problem. The user cannot proceed until a valid e-mail reference is entered.

The default for the chat checkbox control is that it remains unchecked The chat feature requires a chat URL registry entry to be specified by the network administrator (performed externally of POWERPOINT). If this URL has not been specified, then the chat checkbox control is disabled.

The recording section of dialog 300 includes a record broadcast checkbox control 340, with an associated save location field 342. Selecting the record presentation broadcast checkbox tells POWERPOINT to record the presentation broadcast content (slides in an HTML format file and streaming audio and video content in an ASF file) for on-demand access. The user identifies a location in the save location field to indicate to the system where the presentation broadcast content is to be stored by activating a browse button 344. The browse button enables the user to identify the location by browsing the user computer's file system. Selecting the browse button automatically checks the record presentation broadcast checkbox control (if it isn't already checked). The save location field contains static text and may not be manually edited. The default save location is derived from the system registry as an option that has been specified for the presentation design application. This field specifies only the location of the archive, not the complete archive file name. When the archive is created, it will be named using the following format: <NAME><XXXXYYZZAABBCC>.asf where <NAME> is the file name and XXXX refers to the year, YY the month, ZZ the day, AA the hour, BB the minute, CC the seconds, e.g., My Presentation19990427080104.asf.

In addition, the presentation broadcasting settings form includes a speaker notes checkbox 346, which specifies whether attendees will have access to the speaker notes. If this option is selected, the speaker notes are saved with the HTML content of the presentation broadcast, to enable the audience to access the speaker notes when they browse the presentation broadcast. The default setting for this option is unchecked. The presentation broadcasting settings form may also include a note to inform the user to select a NETSHOW server to reach more than 15 viewers. This note is hidden if a NETSHOW server has already been specified by the user or by the network administrator.

Figure 6:
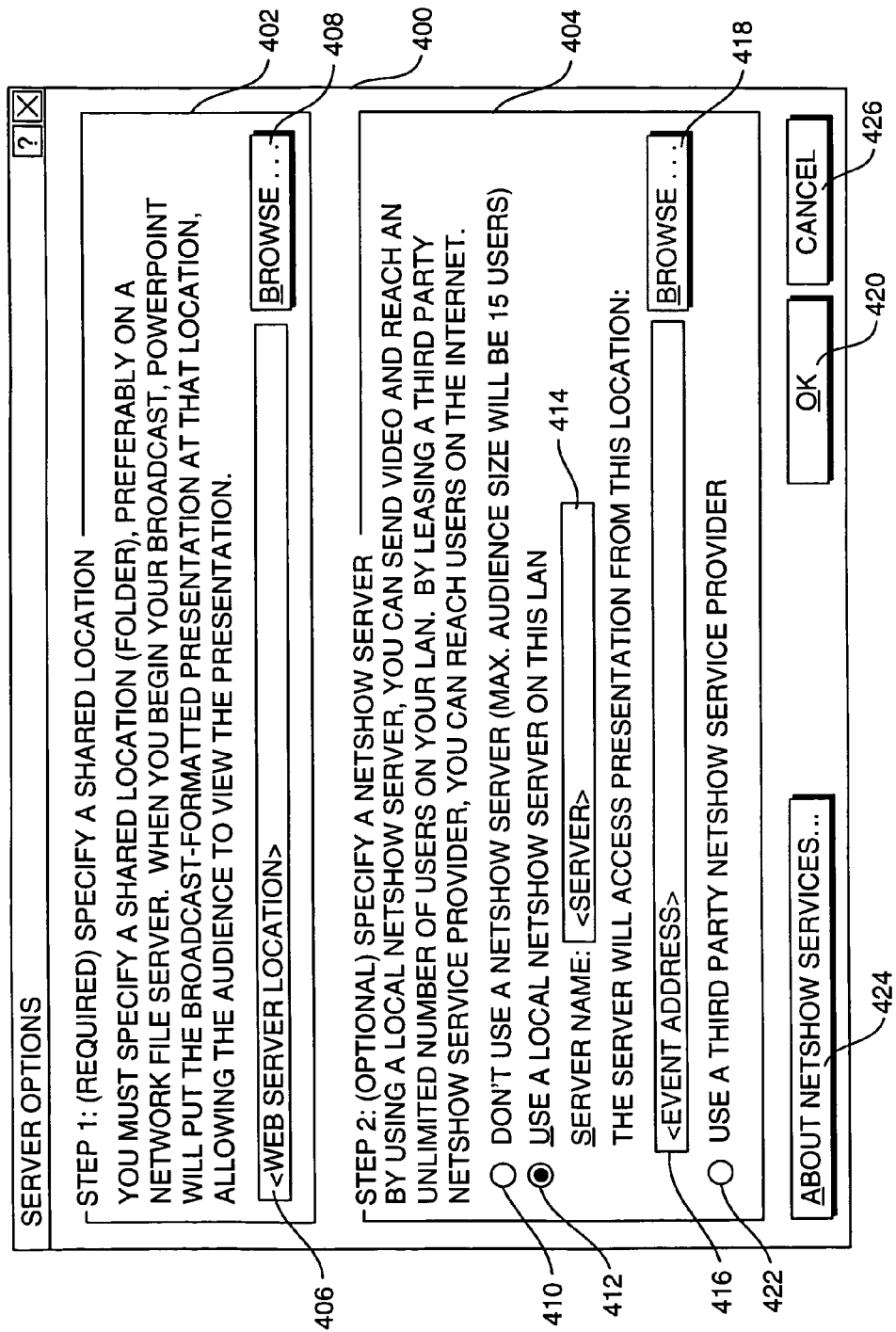
FIG. 6 is a dialog illustrating exemplary information entered with regard to a server option used for the presentation broadcast.

Selection of a server options button 348 causes the logic to proceed to a block 118 (FIG. 1), which launches a server options dialog 400, as shown in FIG. 6. This selection does not dismiss the presentation broadcast settings dialog, which remains in the background. The server options dialog enables the user to override the preset default file locations and any preset or default NETSHOW server name. It will be necessary for the user to open this dialog if a network administrator is unavailable to modify these settings, or if the network administrator has not set up the NETSHOW server parameters. There may also be special cases where different file locations need to be used. In addition, multiple presentation broadcasts of the same presentation broadcast file can be scheduled by using the same file locations.

The server options dialog box comprises a required file server section 402, and an optional NETSHOW server section 404. Server section 402 includes a file server location field 406, and a browse button 408. The data in the file server location field identifies a shared location or directory, either on the user's local computer or a server, where POWERPOINT will store the HTML pages for the presentation broadcast. When attendees view the presentation broadcast, they can retrieve pages from this shared directory, so it is good practice to put these files on a server with adequate capacity for the files and capability to provide access by the expected audience. A default file server location is preferably provided in the registry of the local computer by the network administrator. The registry value will be of the form \\machine\user\presentation. Appended to this prefix will be the user name and a unique folder name. The string "presentation" is a resource that can be localized. The unique folder name is based on the current date in numeric form. If a folder corresponding to the current date already exists, a new folder is created by appending a numeral to it.

The second step for filling out the server options dialog is to specify a Microsoft Corporation WINDOWS™ Media Services server (e.g., a server running the NETSHOW™ server program). There are three options available: (1) not to use a WINDOWS™ Media Service server, (2) to use a WINDOWS™ Media Service server, or (3) to outsource the hosting of the presentation broadcast to a third party WINDOWS™ Media Service Provider.

The user can select not to use a WINDOWS™ Media Service server by choosing a "don't use a NetShow server" radio button 410. If the user selects this option, the attendees will be connected to the host computer via the WINDOWS™ Media Encoder. The encoder is a feature of POWERPOINT that is incorporated in the program and provides direct streaming of audio/video content. This option will limit the live presentation broadcast of the presentation broadcast to an audience of up to 15 attendees. In addition, the extra overhead associated with streaming the audio/video content may slow down slide changes and animation during the presentation. Thus, if the presentation broadcast is to include live video content, it is preferable to use a WINDOWS Media Service server.

The user can selectively use a WINDOWS™ Media Service server by choosing a "use a local NetShow server on this LAN" radio button 412. This selection will enable a server name field 414 to receive information input by the user. The server name field is an edit field that can be manually used to enter text to identify the local NetShow server that will be used. If the local NetShow server does not have access to the shared file location (i.e., Web server location 406), a server access location field 416 and its corresponding browse button 418 are enabled. The server location field is a static field that requires the use of browse button 418, which enables the user to browse the file system to select a location at which the WINDOWS Media Service server will access the presentation broadcast files. Preferably, the entered server name is validated when the user activates an OK button 420, which is used to indicate that the entry of server options information is complete. If the location/server name cannot be validated, an alert (not shown here) is displayed, indicating: "Could not find the computer named <server name>. Continue anyway?" with corresponding "yes" and "no" buttons displayed. This condition may occur if the selected computer is not currently connected to the network, or if the name is incorrect. Selection of the "no" button will place the focus in the server name field. The NetShow server location should be created in the same way that the file server location is created. A default value of the form \\netshow\user will be stored in the registry. The same username and folder name with date will be appended, as discussed above.

In addition to the actions taken above, the user (or network administrator) will need to create a presentation broadcast publishing point, and configure the server to stream the audio/video directly from the presenter's machine or the system running the WINDOWS™ Media Encoder.

If the user desires to broadcast the presentation over the Internet and doesn't have the bandwidth or servers available to handle the expected load, the user should select the option to use a third-party NETSHOW™ provider by choosing a "use a third-party NetShow service provider" button 422. No additional input concerning the third-party provider is necessary at this point—this information is subsequently entered.

The user may view information concerning using NETSHOW™ services by selecting an "about NETSHOW™ services" button 424, which will open the browser at a URL on the www.microsoft.com domain that contains information about using NETSHOW™. Activation of a cancel button 426 returns the user to the presentation broadcasting settings form without saving the server options information. Activation of the OK button validates and saves the server options information and returns the user to the presentation broadcasting settings form. The default radio button setting for the NETSHOW options, along with the server name, and the server access location field value are preferably provided in the registry by the network administrator, so that the user doesn't have to manually select and/or enter this information.

Once the information fields of the description form have been completed, the user may select a schedule presentation broadcast button 331 to schedule the presentation broadcast. Optionally, if the server option file server settings have been properly configured (by the user or by a network administrator), and a NETSHOW™ server has been selected, then entry of the schedule dialog is not necessary, and a new meeting request form is launched upon activation of the select presentation broadcast button. If the file server information has not been set, then the server options dialog will be displayed. The user will need to enter the file server information at this time.

Figure 2:
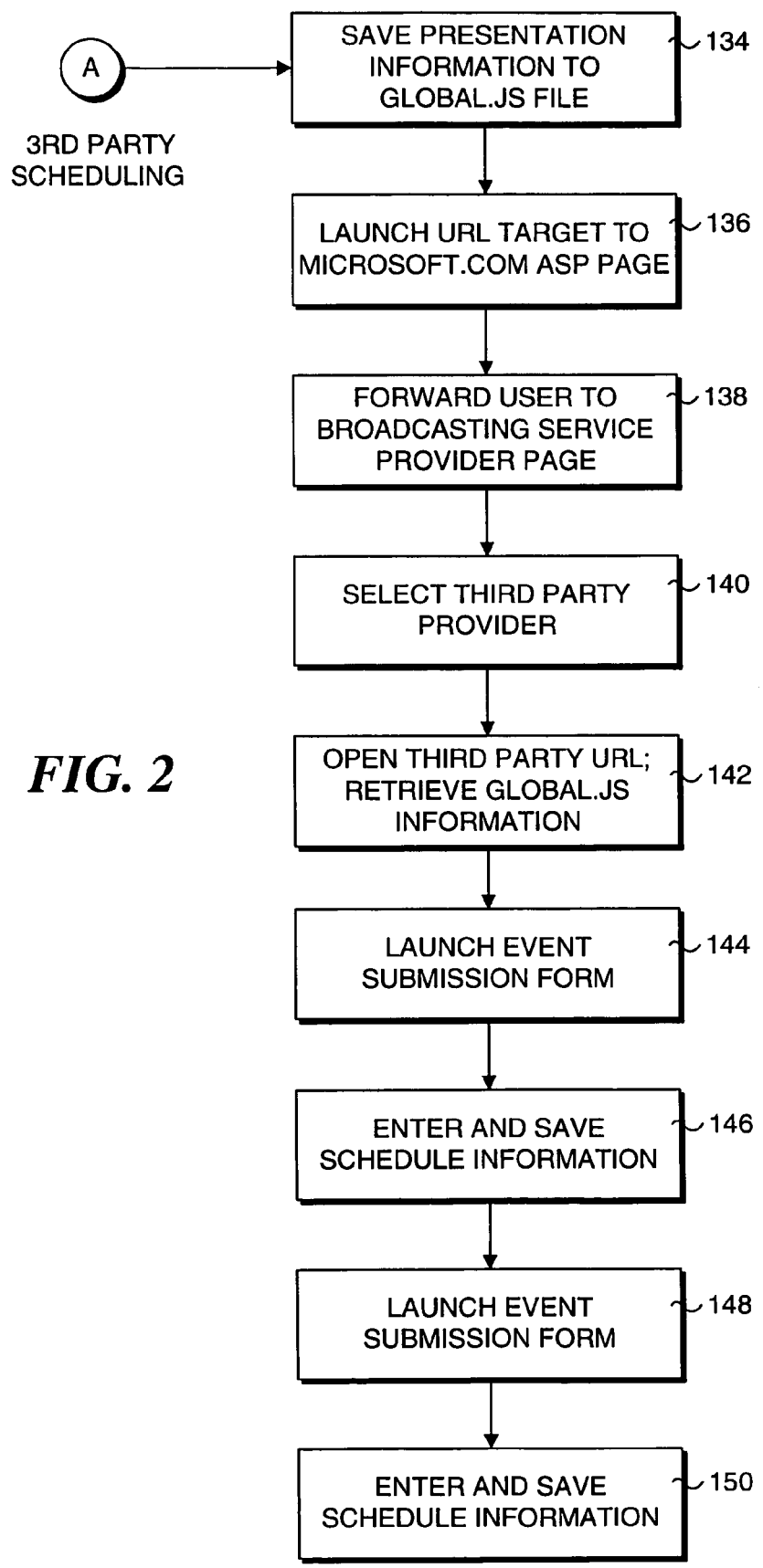
FIG. 2 is a flowchart illustrating the logic employed when scheduling a presentation broadcast that will be broadcast using a server of a third party provider.

The logic proceeds to a decision block 119 (FIG. 1), where a determination is made as to whether "use a third-party NetShow service provider" button 422 was selected in the server options. If so, the logic proceeds to a third party scheduling section, as shown in FIG. 2 (see discussion about third party scheduling below). Otherwise, the logic determines whether a non-NETSHOW server was selected under the File Server options. If so, the following alert will be displayed to the user: "A maximum of 15 attendees will be able to watch the live presentation broadcast unless you specify a NetShow server. Would you like to continue without a NetShow server?" and "yes" and "no" buttons will be provided. Selection of the "yes" option launches the meeting request (see below). Selection of the "no" option returns the user to the schedule dialog and launches the server options dialog.

Returning to FIG. 1, the logic next flows to a block 120, which concerns further details of the scheduling process that are not pertinent to the present invention. In summary, this process enables a user to send out automatically populated e-mail meeting request notifications concerning a future presentation broadcast to a list of potential attendees, so that the attendees may elect to attend the presentation. If the attendees have the OUTLOOK 2000™ application program installed on their computers, a reminder will automatically be entered in their OUTLOOK 2000 calendar, should they choose to attend.

Changing Broadcast Settings and Rescheduling a Broadcast

Figure 7:
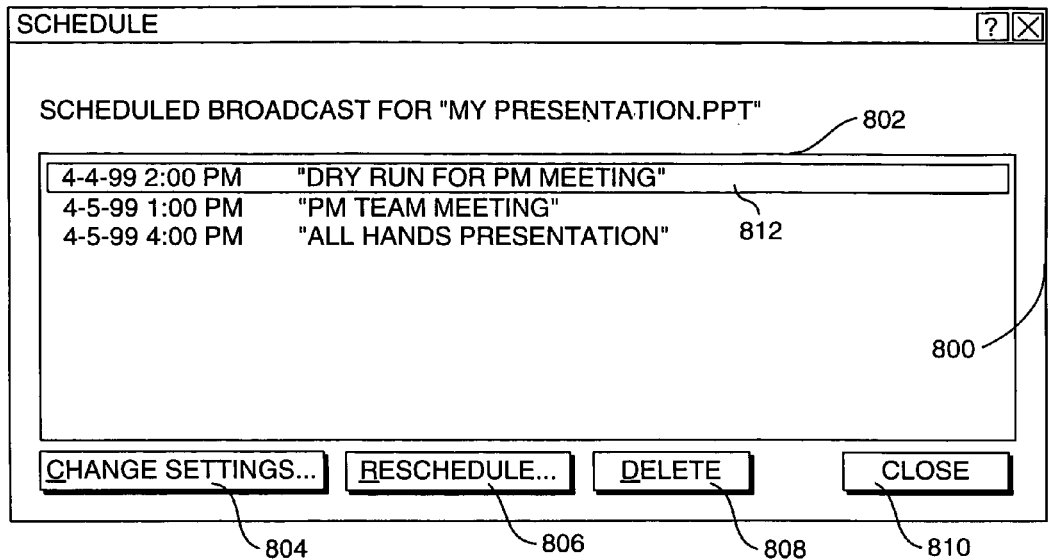
FIG. 7 is a dialog used for changing the settings of a presentation broadcast or a rescheduling a presentation broadcast.

As discussed above, schedule presentation broadcast dialog 200 (FIG. 3) includes change settings option 204 for use in changing settings or rescheduling a presentation broadcast. The user can choose to change the settings of an existing presentation broadcast or reschedule an existing presentation broadcast by activating the change settings radio button, which causes the logic to proceed to a block 130 (FIG. 1). As a result, a schedule dialog 800 is displayed, as shown in FIG. 7. The schedule dialog includes a selection list 802, a change settings button 804, a reschedule button 806, a delete button 808, and a close button 810.

The user first selects a scheduled presentation broadcast from selection list 802, which will include a list of events that have been saved with the current presentation broadcast, such as a "dry run for pm meeting" 812, as shown in this example. If the user chooses the change settings button, schedule information dialog 300 is brought up (FIG. 5). The schedule information dialog is the same as discussed above, except that the "schedule presentation broadcast" button is replaced by an "update" button. The user can change the settings in both description form 302 and presentation broadcasting settings form 316, as well as the settings in the server options dialog. Activation of the "update" button causes the Lobby Page to be regenerated (in the background) and saves any changed information to the presentation broadcast file. Note that the URL cannot be changed—it's already been sent out in the meeting request e-mail notifications. Therefore, this field is disabled or grayed in the server options dialog.

Scheduling and Setting Up an Internet NETSHOW Presentation Broadcast

The user may desire to use an Internet server running NETSHOW leased from a third party to broadcast the presentation to allow the presentation to be broadcast over the Internet to anyone who has access to the NETSHOW server. The user can choose to use a third party NETSHOW provider by selecting "use a third-party NETSHOW service provider" button 422 on the server options dialog (FIG. 6) when entering the server options information. The user will select OK button 420, which opens schedule information dialog 300, and will then select schedule presentation broadcast button 331, as before, to schedule the presentation broadcast.

With reference to FIG. 1, if a third party provider was selected under the server options, the answer to decision block 119 is yes, and the logic proceeds to the third party scheduling logic flowchart shown in FIG. 2. In a block 134, the presentation broadcast information for the lobby page is generated and stored in a global.js file. This file contains all the information necessary to broadcast the presentation, except for scheduling information that is entered later (see below). The information includes a file server location (FileServerLoc) that identifies where the HTML files for the presentation are stored.

Next, a block 136 opens the user's INTERNET EXPLORER™ browser program with an initial URL that targets an Active Server Page at Microsoft.com, redirecting the browser to a NETSHOW™ presentation broadcasting service provider page through microsoft.com's Active Server Pages (ASP) architecture, as indicated by a block 138. The initial URL is stored in the system registry on the user's local computer when the presentation broadcasting files of POWERPOINT are installed (these files are optional, and may not be included in typical POWERPOINT installations) under an appropriate key.

The URL that is used to launch the ASP page at Microsoft.com contains embedded information that a control on the ASP page deciphers so the further processing can be performed. The embedded information includes the location of the global.js file, the LCID (a language identifier, e.g., 1033 for English), and the status of the request from POWERPOINT. The form of the URL is as follows:

http://officeupdate.microsoft.com/office/redirect/fromOffic9/
  PresBroadcasting.htm?DPC=%ProductCode%&DCC=
  %AppComponentCode%&AppName=
  %ApplicationName%&HelpLCID=%
LCID%&FieServerLoc=
  "<FileServerLoc>"&Status="<Status>"

for example:
http://officeupdate.microsoft.com/officelredirect/fromOffic9/
  PresBroadcasting.htm?DPC=%ProductCode%&DCC=
  %AppComponentCode%&AppName=
  %ApplicationName%&HelpLCID="1033"&FileServerLoc=
  "\\myserver\user\myname\
  MyPresentation19990427080104"&Status="Sc
  hedule"

The values of DPC, DCC, and AppName are all Microsoft related information. The values for Status are "Schedule," "Update," "Begin," and "Delete."

The NETSHOW™ presentation broadcasting service provider page contains information concerning NETSHOW™ presentation broadcasting, including a list of links to third party NETSHOW™ server providers. These third party providers are partners with the Microsoft Corporation, providing hardware and software services that allow companies and individuals to lease access to NETSHOW™ servers. The list of links presented to the user will depend on the LCID value, so that the listed third party providers are somewhat localized to the user. For instance, if the LCID value corresponds to German, a list of German third party providers will be presented to the user. The logic next proceeds to a block 140 (FIG. 2), wherein the user chooses one of these links to select a third party provider.

Selection of a third party provider creates a URL that launches a web page corresponding to the selected third party provider, as shown by a block 142. The URL contains embedded information that is used by a control on the third party provider's web page to receive the file server location, LCID, and status. The URL will be in one of the following forms, depending on whether its corresponding web page is to be used for scheduling or broadcasting a presentation.

http:/www.<3rdparty>.com/schedule.htm?HelpLCID=
  %LCID%&FileServerLoc="FileServerLoc>"&Status=
    "Schedule"
http:/www.<3rdparty>.com/broadcast.htm?HelpLCID=
  %LCID%&FileServerLoc="FileServerLoc>"&Status=
    "Begin"

for example,
http:/www.<3rdparty>.com/schedule.htm?HelpLCID=
"1033"&FileServerLoc="\\myserve
  r\user\myname\MyPresentation19990427080104"&
    Status="Schedule"
  http:/www.<3rdparty>.com/broadcast.htm?HelpLCID=
    "1033"&FileServerLoc=
    "\\myserver\user\myname\
  MyPresentation19990427080104"&Status="Begin"

In the case of scheduling a new broadcast, the Status value will be "Schedule," and the URL will target the schedule.htm page on the third party's web server. In addition to the embedded information, the global.js file is also forwarded to the targeted web page, which can download the global.js file via a control (e.g., an FTP-type control) on the page or third party web site.

Each third party provider provides a web interface page containing an event submission form 1100, similar to that shown in FIG. 8, which will then be launched in a block 144 (FIG. 2). To schedule such a presentation broadcast, the user must inform the third party provider of the desired times and date and provide some of the presentation broadcast information generated above. The third party provider may provide user registration or user validation pages prior to presenting an event submission form to the user.

The event submission form includes a title field 1102, a description field 1104, a start date/time field 1106, an end date/time field 1108, a related URL field 1110, a location field 1112, and a contact's e-mail alias field 1114. The event submission form also includes a content type radio button group, comprising a "live" radio button 1116, an "on-demand" radio button 1118, and a "live with slides" radio button 1120. The information in the title, description, and location fields will already be completed with the presentation broadcast information previously entered above. The contact's e-mail alias defaults to the current user's e-mail alias, but can be changed. The user must enter the start time and date information, along with the end time and date information, as indicated in a block 146 (FIG. 2). Optionally, a related URL, which may be used to display a web page that contains information concerning the presentation broadcast, can be entered. Upon completion of this dialog, the user selects a "submit event request" button 1122 to submit the request to the third party NETSHOW provider. The third party provider will then schedule a NETSHOW presentation broadcast based on the information provided in the event submission form.

It is likely that the particular field format and layout of each third party provider's event submission form will differ from the above example, and may request different or additional information, include other check boxes, radio buttons, and edit fields. For example, a third party event submission form may include information concerning presentation broadcast settings, such as an indication of whether audio and video are to be used, the types of viewer feedback that will be accepted, etc. The event submission form may also include leasing information, such as the number of viewers that may receive the presentation broadcast.

Once the event is submitted and accepted, in a block 148 of FIG. 2, the third party provider sends a control to the user's local computer so that POWERPOINT can properly transmit the presentation slides and streaming audio/video content to the third party provider during a live broadcast of the presentation. The control comprises a set of dynamic link library (DLL) files that interface with POWERPOINT to provide the appropriate functionality. The user will be presented with a dialog asking whether to download the control, and selection of the dialog's OK button by the user will initiate downloading of the control to the user.

After the third party control has been successfully downloaded, the third party provider preferably displays a web page that contains a URL at which the presentation broadcast will be viewed. The page preferably also displays a list of instructions for performing the presentation broadcast, and a list of details concerning the presentation broadcast to verify that proper selections were entered in the event submission form.

As a preferred option, the third party provider will additionally provide an e-mail confirmation message to the user containing the scheduling and selected presentation broadcast information, as indicated by a block 150 (FIG. 2). The user can then forward this e-mail message (or create a new message containing some or all of the information provided in the confirmation message) to the prospective attendees so that they can schedule the presentation broadcast, if they choose to attend.

Broadcasting the Presentation

General Overview

Figure 9:
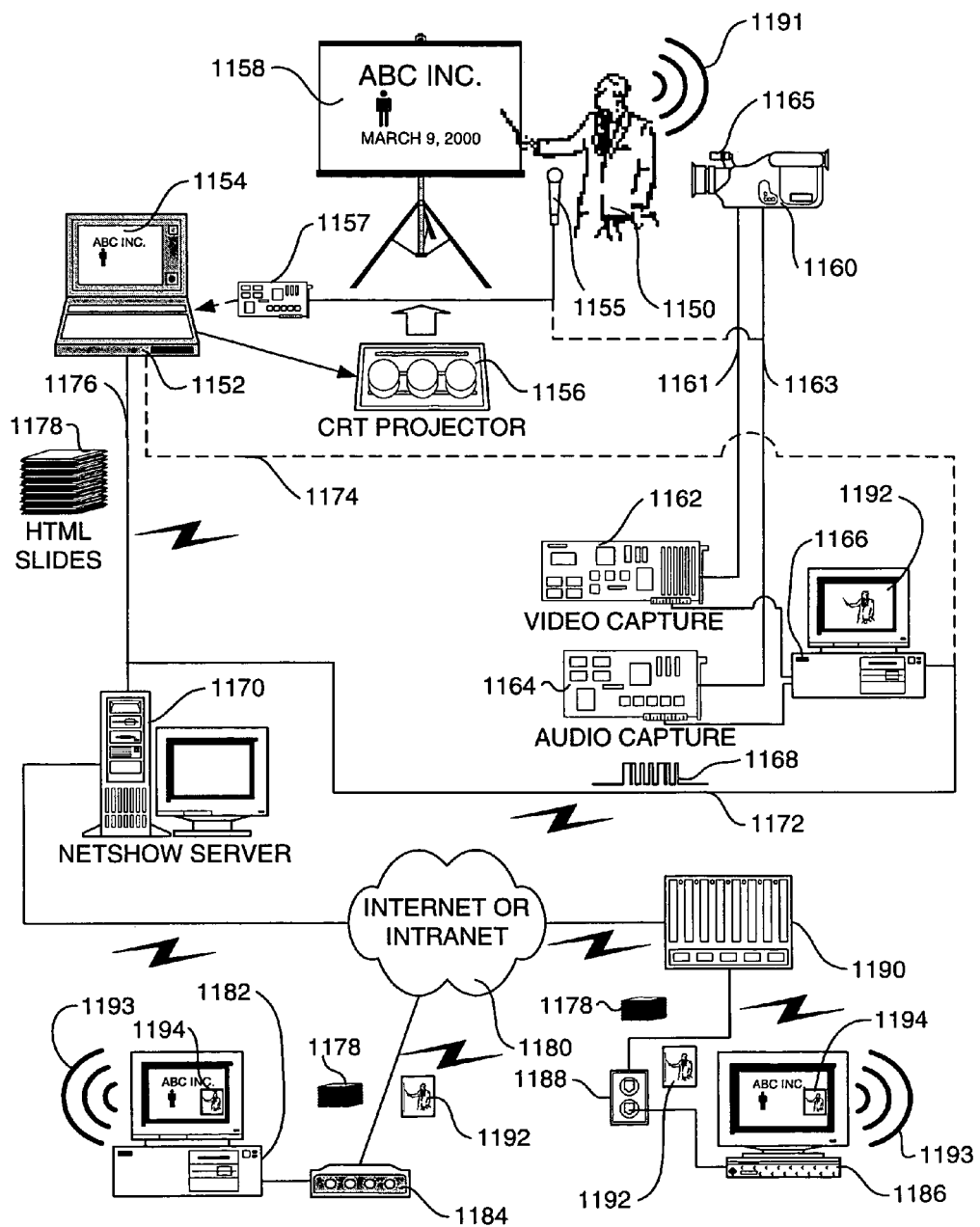
FIG. 9 is a schematic overview diagram of a typical presentation broadcast.

A schematic diagram illustrating an overview of a typical live presentation broadcast is shown in FIG. 9. A live presentation will usually include a slide show (i.e., a POWERPOINT presentation) that is narrated by a presenter 1150. A computer, such as a laptop computer 1152, is used to control display of the slides during the presentation. The slide show is initiated from within POWERPOINT by activating a "Slide Show→Online Broadcast→Begin Broadcast" menu pick, which causes POWERPOINT to perform several steps in preparation for broadcasting the presentation, as discussed in detail below. After the preparation steps have been completed, the presenter can start the presentation broadcast, which brings up the first slide in the slide show and removes the user-interface portion of POWERPOINT so that the slide occupies a large portion of a display screen 1154 of laptop computer 1152. The presenter advances through the slide show by activating the computer's space bar. If the option is selected during the presentation design process, animation effects may also occur when new slides are displayed.

In the system's simplest configurations, attendees of an online presentation broadcast will be able to view the graphic and text content of the presentation slides, while simultaneously receiving an audio narrative provided by the presenter during the live presentation. These configurations corresponds to the default selections in the set up dialogs discussed above. In more advanced configurations, the online attendees of the presentation broadcast are able to view a "live" video image of the presentation. Details of both of the simple and more advanced configurations are described below.

In the default (i.e., audio-only configuration), the narrative audio content of the presentation will be enabled through the use of a microphone 1155 disposed in proximity to presenter 1150. In some cases, the live presentation will not be given to an in-person audience, but instead will simply be narrated by presenter 1150 while advancing through the slides on laptop computer 1152. In these instances, the laptop computer's built-in microphone (if it exists and produces a sufficiently high quality audio signal) can be used. In other instances, it may be desirable to give the presentation in front of a live audience, for example, using a CRT projector 1156, which is connected to laptop computer 1152 and projects the slide show images onto a projection screen 1158. In general, CRT projectors project replicated images of whatever is displayed on the display screen of their input source (i.e., display screen 1154 of laptop computer 1152). In instances where a CRT projector is used, microphone 1155 will preferably comprise a lapel microphone (worn by the presenter), or a microphone placed in close proximity to the presenter.

Microphone 1155 produces an analog audio signal of the presenter's narration, and the audio signal is converted into a digital signal through a sound capture circuit 1157 contained within laptop computer 1152. Modern laptop computers generally include a sound "card" subsystem (generally not a separate card but rather embedded circuitry) that includes a sound capture circuit such as sound capture circuit 1157. An input side of the sound capture circuit receives the analog audio signal from a microphone that is connected to the sound capture circuit via a microphone input jack on the laptop computer. Sound capture circuit 1157 produces a streaming digital signal through the use of an ACM-compliant codec, which converts the streaming digital signal into an ASF stream using a WINDOWS™ media encoder application program that is running on laptop computer 1152. During the presentation, the laptop computer sends the ASF stream to a NETSHOW™ server 1170 via a communication link 1176, so that the ASF stream is multicast to a plurality of online attendees, as discussed below.

In many instances, it will be desirable to transmit "live" visual images of the presenter to the online audience during the presentation. In most circumstances, such presentations will use a CRT projector, as described above. An advantage of including a live visual image is that the presenter can use his hand and/or a pointer to identify specific points of interest in the slides, and the image of the presenter also creates a greater sense of participation by the online attendees. If the presenter is not close to laptop computer 1152 during the presentation, a remote control (not shown) may be used to advance the slides or an assistant stationed at the laptop computer may carryout this task.

In order to provide a live video image, it is necessary to provide a device that produces a video signal of acceptable quality, such as video camera 1160. Preferably, video camera 1160 will be directed at presenter 1150 and/or projection screen 1158, thereby producing a video signal 1161 comprising content corresponding to visual aspects of the live presentation content and an audio signal 1163 (produced by a microphone 1165) corresponding to the presentation's narrative. Optionally, audio signal 1163 may be provided by microphone 1155. Video signal 1161 is received and processed by a video capture card 1162, while audio signal 1163 is received and processed by an audio capture card 1164. (Optionally, video and audio signals 1161 and 1163 may be received by a combination audio and video capture card, which is not shown.) Generally, each of the audio and video capture cards 1162 and 1164 (or a combination capture card) will be connected to an expansion bus in an encoding computer 1166. Optionally, encoding computer 1166 may comprise an embedded audio capture circuit, similar to that discussed above for laptop computer 1152. Each of video signal 1161 and audio signal 1163 are encoded into digital streams through the use of their respective capture cards (or circuits), using suitable VCM- and ACM-compliant codecs. These digital streams are then encoded into an ASF stream 1168 by the WINDOWS™ media encoder module known as "REX" (real time encoder), which is running on encoding computer 1166. The ASF stream is then uploaded to a NETSHOW™ server 1170 via a network communication channel 1172.

In instances in which the live video image is to be broadcast, laptop computer 1152 is also connected via a communication link 1174 to encoding computer 1166, and via communication link 1176 to NETSHOW™ server 1170. In most situations, both laptop computer 1152 and encoding computer 1166 will be linked together across a LAN. In some installations, it may be preferable to run the POWERPOINT slideshow directly from encoding computer 1166. In these instances, there would be no need for laptop computer 1152, and encoding computer 1166 would be connected to (and provide an input display signal to) CRT projector 1156.

Prior to the start of the presentation, as explained in further detail below, a plurality of HTML slide files 1178 are uploaded from laptop computer 1152 to NETSHOW™server 1170 via communication link 1174. The HTML presentation slide content of these files is then broadcast over the Internet or over an intranet (represented by "cloud" 1180) by NETSHOW™ server 1170 to a plurality of computers and workstations from which the presentation can be viewed, including a personal computer 1182 connected via a modem 1184 to Internet 1180, and a workstation 1186, which is connected to Internet 1180 via a network wall plug 1188 and a network hub 1190. Preferably, at least part, and more preferably, all of the HTML presentation slide content is cached in each of the attendees' computers prior to the start of the live presentation.

Figure 10:
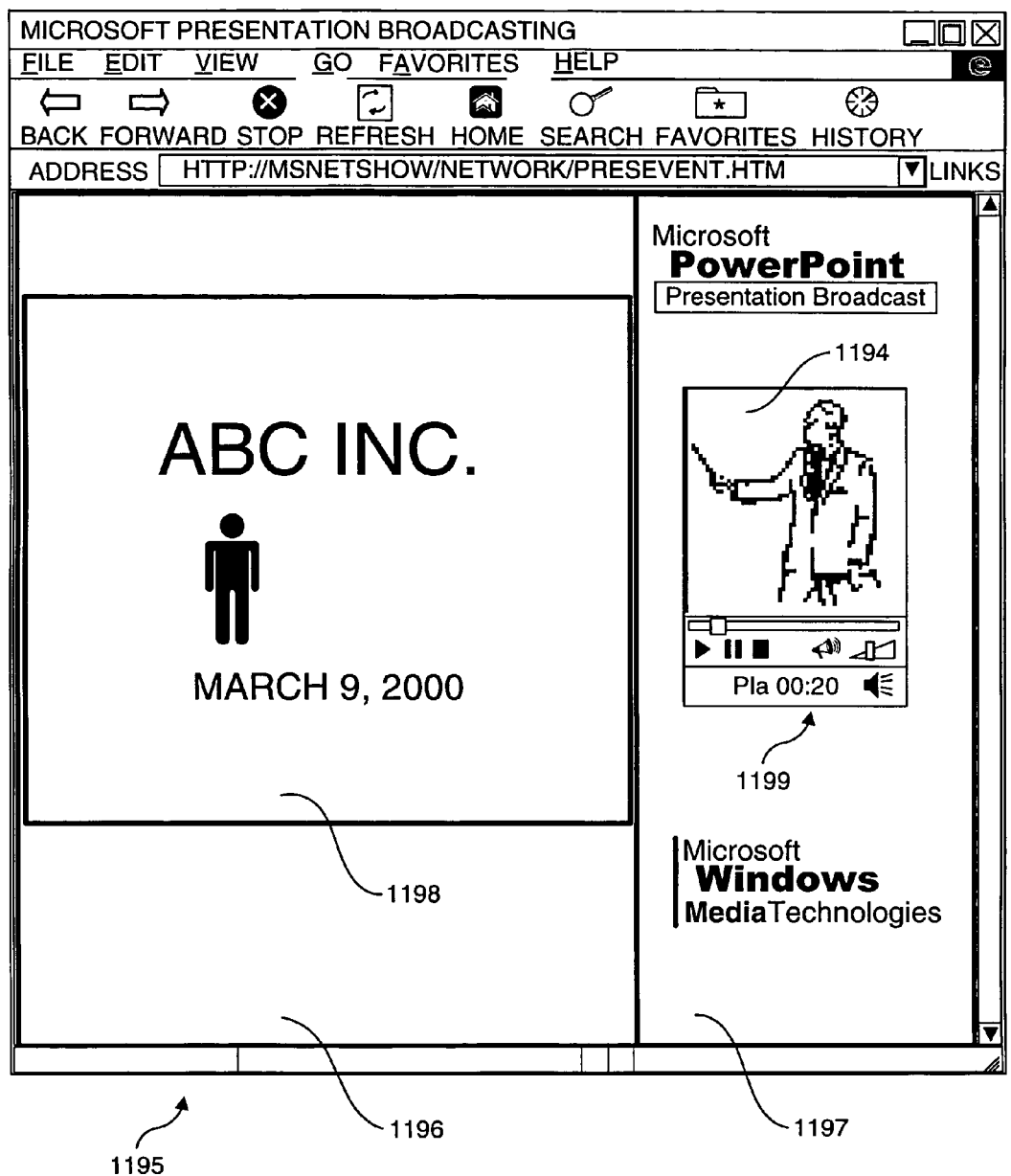
FIG. 10 is an exemplary browser page corresponding to a replication of a live presentation on a remote computer.

As the live presentation is given, audio content 1191 and (if so configured) video content 1192, which respectively correspond to narrative and visual aspects of the presentation that would be observed by a live audience, are broadcast via the ASF stream and the NETSHOW server to the online attendees' computers. The ASF stream is then decoded at each of the attendees' computers by a WINDOWS™ Media Player application program, so that audio content 1191 is replicated as sound 1193 through the use of a sound subsystem (e.g., sound card) contained in each of the attendees' computers, and video content 1192 is used to produce a replicated "live" visual image 1194 on a portion of the displays of the attendees' computers, as shown in FIGS. 9 and 10. At the same time, the slides of the presentation are displayed in an adjacent portion of the display area in synchrony with a display of the slides during the live presentation.

In addition to providing the ASF streaming content to the attendees' computers, the system also coordinates the display of the HTML presentation slide files on the attendees' computers so that each slide is displayed and animated in conjunction with the display and animation of the slide during the live broadcast. This function is performed by slide display commands (i.e., HTML script commands) that are generated in real-time and embedded into the ASF stream. The slide script commands are decoded in the attendees' computers to cause an appropriate slide display and/or animation to occur in synchrony with the live presentation. Further details of this process are described below.

FIG. 10 shows an exemplary display image a viewer would see during a typical presentation broadcast. The display image comprises an INTERNET EXPLORER™ browser window 1195, which includes a primary frame 1196 and a secondary frame 1197. Secondary frame 1197 is also referred to as the "nsframe." Secondary frame 1197 is further sometimes referred to as a child frame, if the primary and secondary frames form a logical parent-child relationship. As each presentation slide is displayed and animated during the live presentation, it is displayed and animated in synchrony as slide image 1198 in primary frame 1196. At the same time, live video content 1192 corresponding to the live presentation is replicated as visual image 1194 through the use of a WINDOWS™ Media Player application program control 1199 disposed in nsframe 1197.

Figure 11:
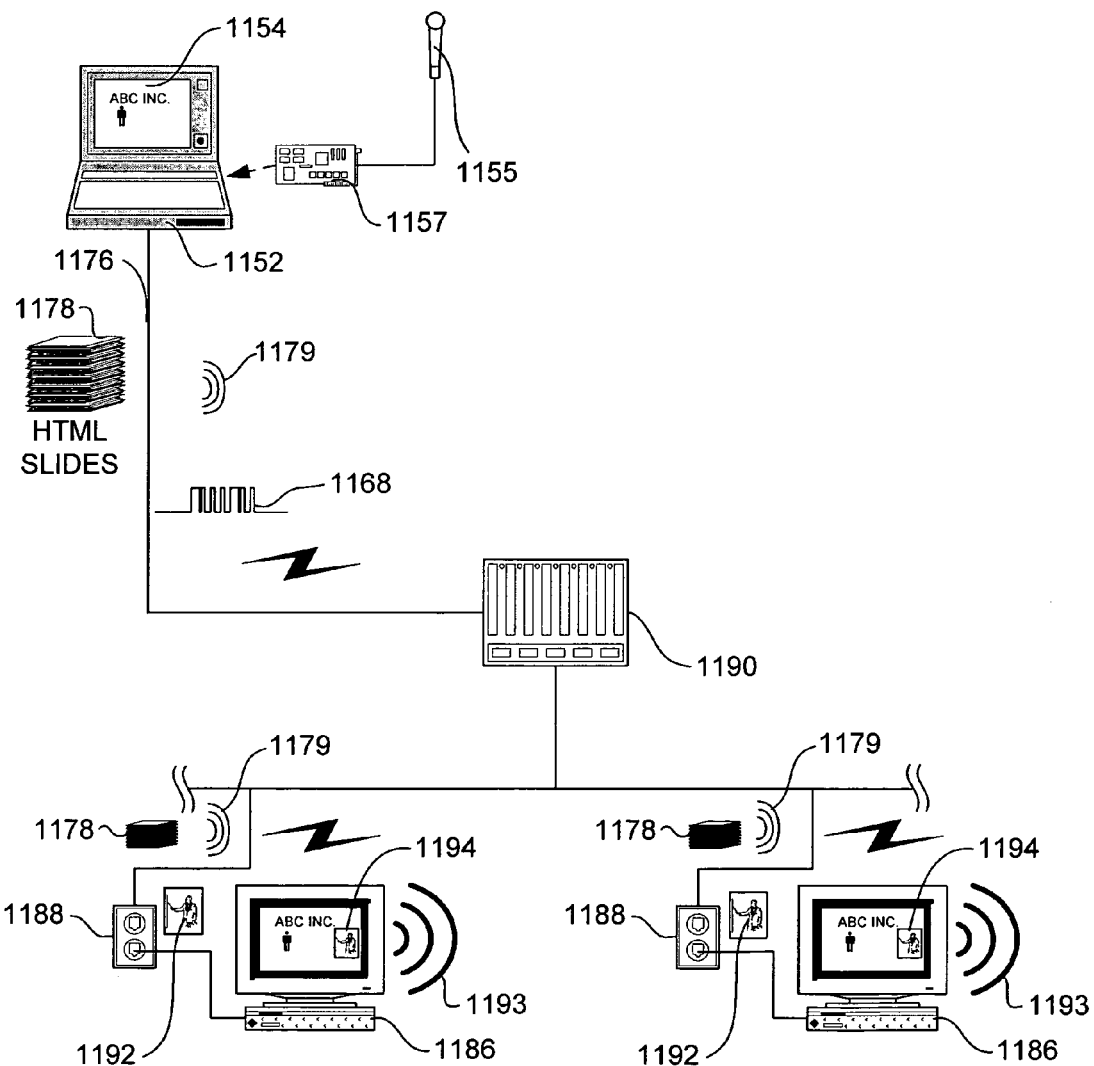
FIG. 11 is a schematic diagram of a configuration of the present invention in which a presentation that includes live audio content is broadcast from a local computer over a local area network (LAN) to a plurality of receiving computers.

An optional configuration of the system in which a NETSHOW™ server is not required is shown in FIG. 11. In this configuration, a presenter is able to broadcast a presentation from the local computer (e.g., local computer 1154) to a plurality of receiving computers (e.g., workstations 1186) across a LAN via hub 1190. As discussed above, presentation broadcasts that do not use a NETSHOW™ server are limited to 15 receiving computers or workstations. It is also noted that various types of LANs are supported, in addition to the hub and spoke type of LAN shown in the Figure. Preferably prior to the start of the presentation, HTML slide files 1178 are broadcast over the LAN to workstations 1186 using a relatively high bandwidth. As discussed in further detail below, HTML slide files may also be received during the presentation at a lower bandwidth, to enable the available bandwidth to be shared with the live presentation portion.

As discussed above, in the simplest presentation configurations, the live content of the presentation comprises only audio content, which is captured through the use of microphone 1155 and sound capture circuit 1157. As the live audio content is captured, it is encoded into an ASF stream 1168 as audio content 1179. At the same time, as the presentation slides are displayed and/or animated during the presentation, slide display commands are generated and embedded into the ASF stream. The ASF stream is broadcast over the LAN to a browser application program running on each workstation 1186, so that audio content 1179 is decoded with the Media Player program to produce sound 1193, and the slide display command portion of the ASF stream is decoded into HTML script commands to display and/or animate the presentation slides in synchrony with the live presentation.

Figure 12:
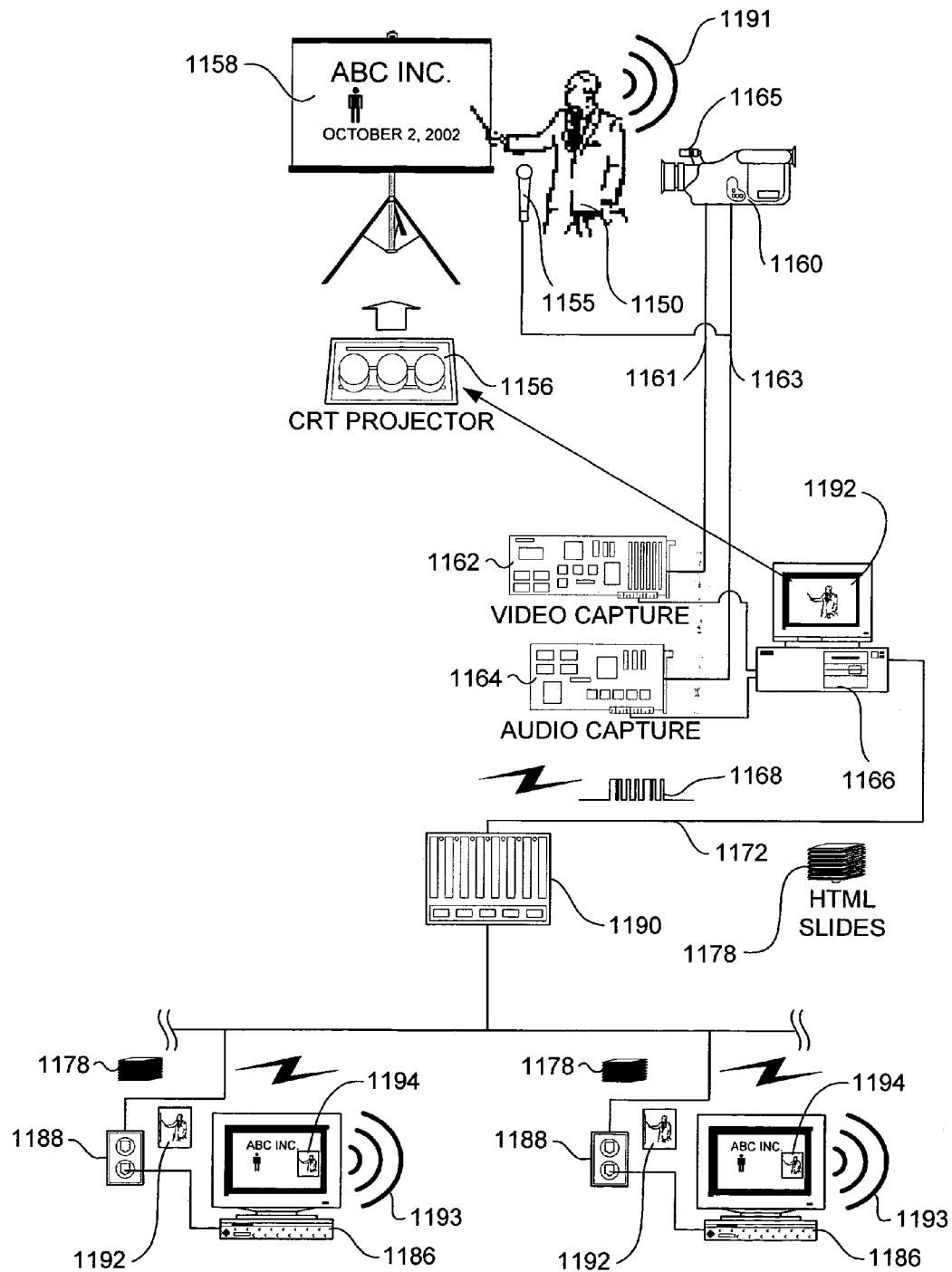
FIG. 12 is a schematic diagram of a configuration of the present invention in which a presentation that includes audio and visual content is broadcast from a local computer over a LAN to a plurality of receiving computers.

Another optional configuration of the system that does not require a NETSHOW™ server is shown in FIG. 12. In this Figure, several components of the system share the same reference numbers with similar components in FIG. 9 that were discussed previously. Except as noted below, these components with the same reference numbers provide the same functions as those corresponding components discussed above. The configuration of FIG. 12 provides a replication of visual aspects of the live presentation in addition to replicating the audio narrative of the presenter.

In FIG. 12, the presentation is performed on encoder computer 1166, which is running POWERPOINT. During the presentation, audio and visual aspects of the presentation are respectfully captured using audio capture circuit 1164 and video capture circuit 1162, which respectively produce digital audio and video signals that are encoded into the ASF stream. In conjunction with the display and/or animation of the presentation slides, slide display commands are generated and embedded in the ASF stream. The ASF stream is then broadcast over the LAN to workstations 1186, enabling the live audio and visual content of the presentation to be replicated, and the presentation slides are displayed and/or animated in synchrony with the live presentation.

Preparing for a Presentation Broadcast

Figure 14:
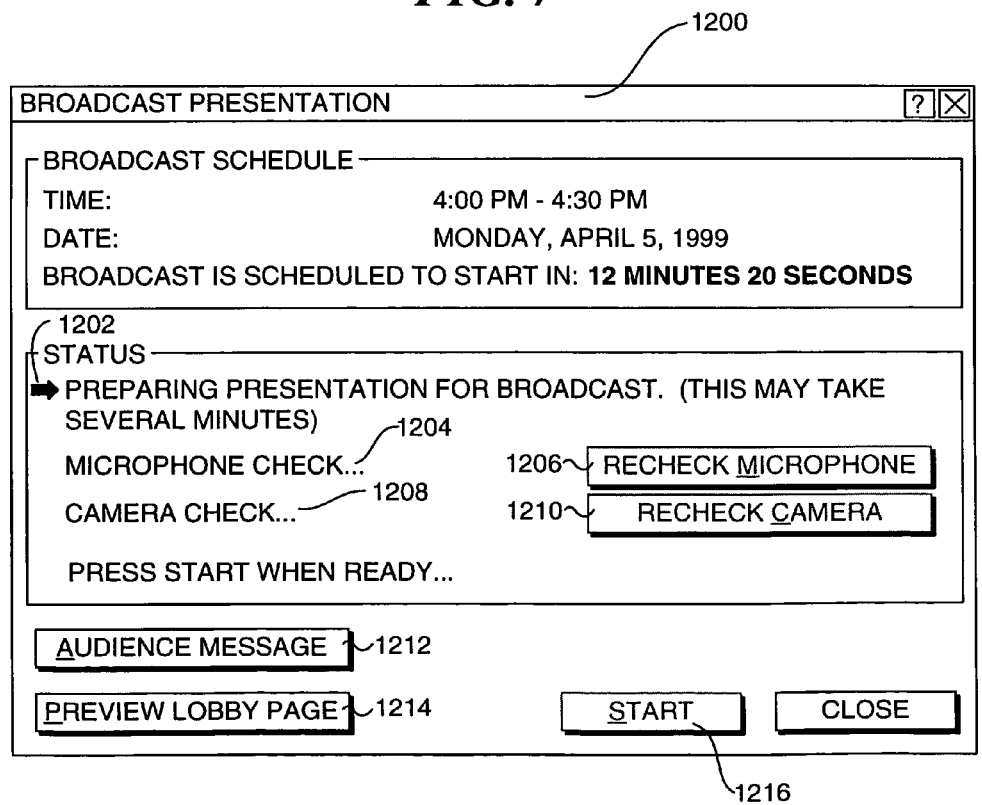
FIG. 14 is a dialog presented to a user at the start of a presentation broadcast.
Figure 13:
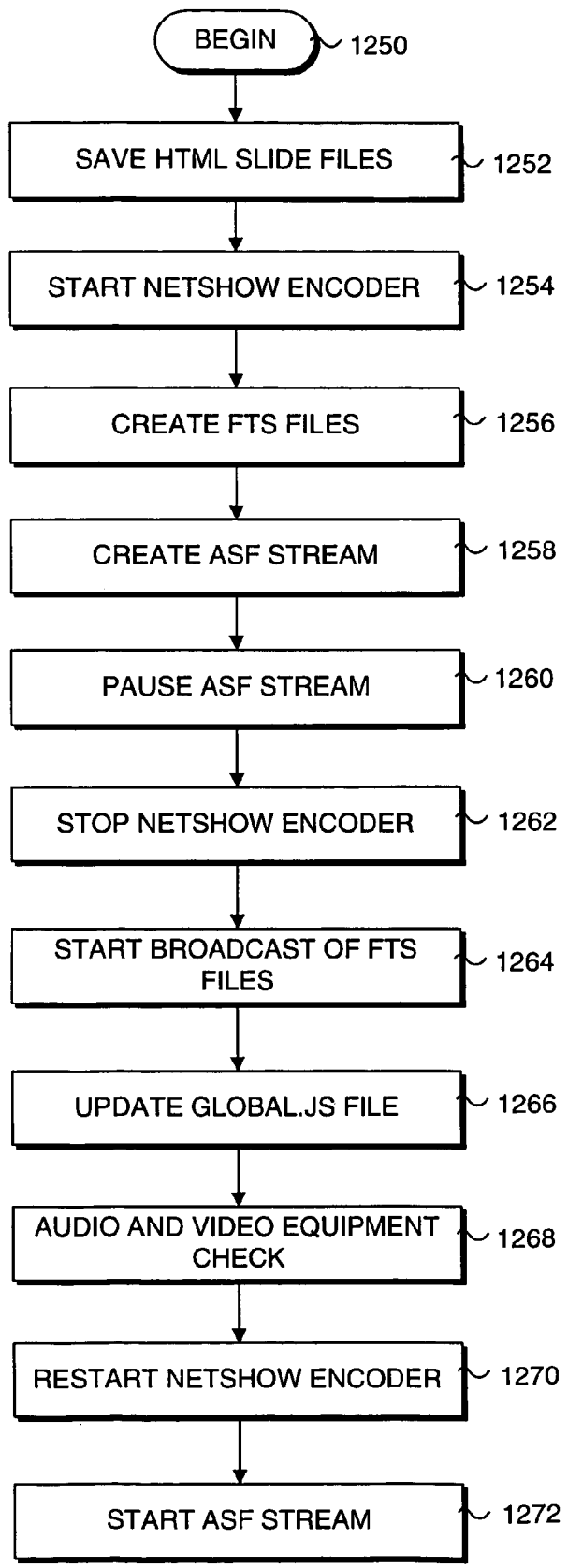
FIG. 13 is a flowchart illustrating the logic employed when preparing for a presentation broadcast.

Prior to broadcasting a presentation, a series of checks and preparation tasks are completed to ensure that the system is properly configured and that the viewers receive a quality presentation. With reference to FIG. 13, the presentation broadcast preparation process begins upon activation of the "Slide Show→Online Broadcast→Begin Broadcast" menu selection from POWERPOINT's main menu, as shown by a begin block 1250. This action opens a presentation broadcast dialog 1200, as shown in FIG. 14. At this time, the system prepares for presentation broadcasting by performing a series of checks to verify that all components are ready, and by performing other preparation tasks, including initiating broadcasts of the presentation slide HTML content, as explained in further detail below. The progress of the checks is indicated by an arrow 1202.

Next, the content of the each presentation slide is saved to an HTML slide file in a preselected directory, as indicated by a block 1252 in FIG. 13. Following this step, the NETSHOW™ encoder (i.e., WINDOWS™ media encoder) is started, and file location checks are performed, as indicated by a block 1254. As discussed above, the NETSHOW encoder encodes the audio and/or video content in real time into an ASF data stream. ASF data streams comprise a plurality of data packets that are sent over a digital communication network, such as an intranet or the Internet. These data packets are sent over a network by inserting each data packet into the data field of a corresponding network packet. ASF data streams may also be stored in files so that they can later be played by an appropriate player, such as the WINDOWS™ media player.

In a block 1256, two file transfer service (FTS) files are created, including a high-bandwidth FTS file and a low-bandwidth FTS file. Both the high- and low-bandwidth FTS files comprise HTML content corresponding to the Lobby page, as well as the HTML slide file content saved above in block 1252.

Next, an ASF stream is created and an appropriate REX I/O port is opened in a block 1258. It is necessary to open an ASF stream prior to initiating the sending of the ASF stream to the NETSHOW server, because the NETSHOW server needs to know where to find the incoming ASF stream. After starting the NETSHOW server and giving it the encoder's output port, the NETSHOW ASF program is stopped, at which point the encoder is paused in a block 1260, and the NETSHOW encoder is stopped in a block 1262. These steps prevent the start of the presentation slideshow from being triggered prematurely.

Next, in a block 1264, the high- and low-bandwidth FTS files are broadcast from the NETSHOW server using an Internet Protocol multicast transfer mechanism that includes forward error correction. (In cases where the presentation is to be broadcast over an intranet, an appropriate intranet protocol is used.) Forward error correction is a system of error correction that incorporates redundancy into the data so transmission errors can, in many cases, be corrected without retransmission of the data Multicasting is a one-to-many means of routing packets to multiple computers, in which the packets are broadcast from a single server. These FTS files are broadcast on a continuous basis (i.e., transmission of each file is repeated) prior to and during the presentation, so that the HTML content of the presentation files can be cached in advance in a viewer's INTERNET EXPLORER browser.

Figure 15:
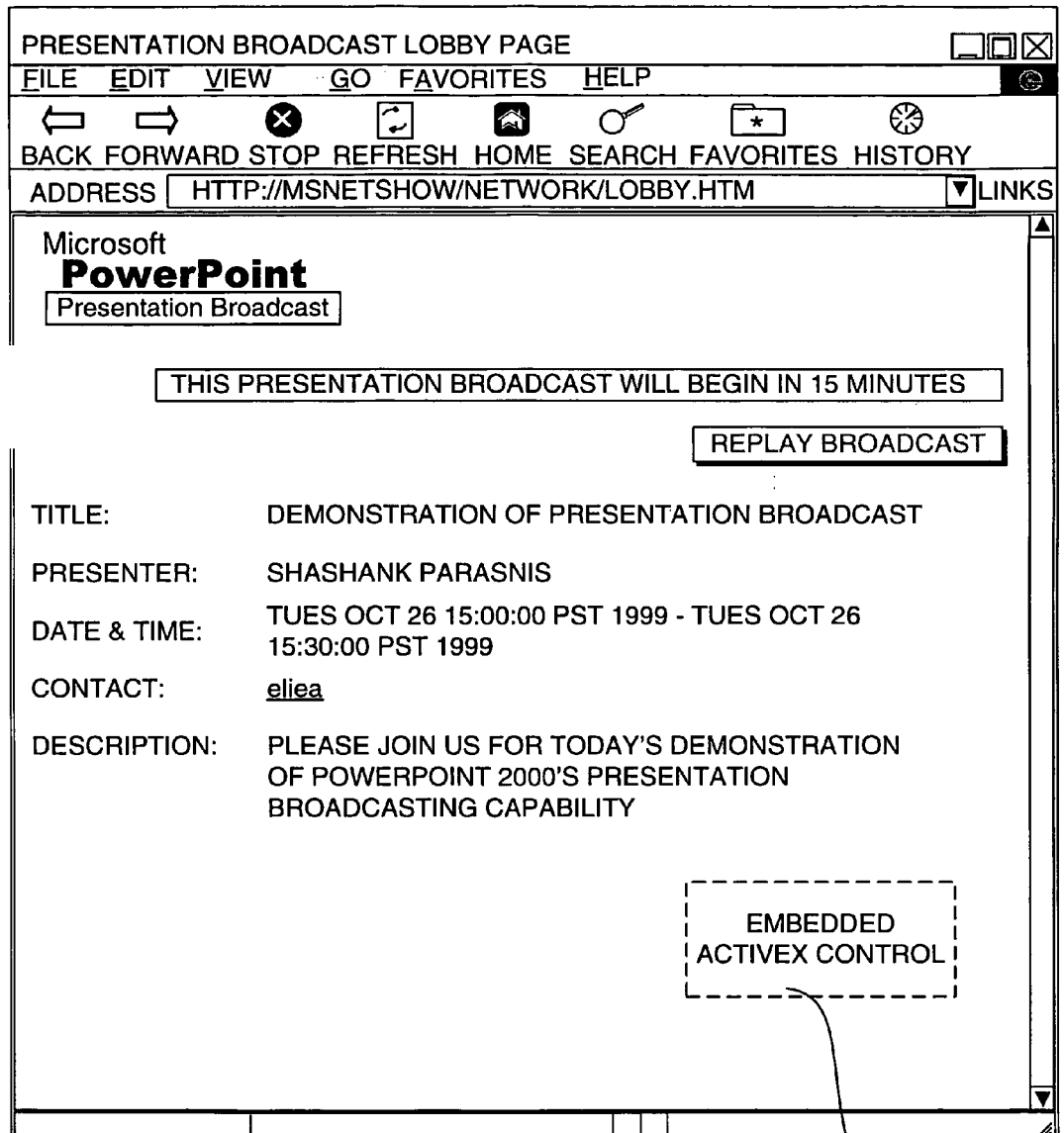
FIG. 15 is a representation of an exemplary lobby page.

A user may receive the high-bandwidth FTS file multicast by browsing the Lobby page, which the online attendees are requested to "visit" prior to the presentation by use of the e-mail meeting request notifications that were sent out to potential audience members during the scheduling process. In order to view the presentation, each attendee must first browse the Lobby page. An exemplary Lobby page 1276 is shown in FIG. 15. The Lobby page contains an embedded (but not displayed) ACTIVEX™ control 1278 that enables the attendee's browser to receive and cache the HTML presentation slide content via the multicast of the high-bandwidth FTS stream while the attendee is browsing the Lobby page. In reality, the high-bandwidth FTS file is broadcast to a predetermined network address, and the embedded ACTIVEX™ control 1278 allows the browser to receive data content from the predetermined network address while the Lobby page is browsed.

The multicast transmission of the high-bandwidth stream preferably employs a substantial portion of the available connection bandwidth of the receiving computers. (In contrast, the low-bandwidth FTS file is transmitted at a much lower transmission rate, for reasons discussed below.) In instances in which an attendee computer's connection bandwidth is exceeded, the browser on the computer will still be able to cache the FTS file, since it is continuously rebroadcast and because of the error checking built into the FTS file transfer scheme.

As will become clearer below, it is preferable that attendees receive and cache the HTML presentation slide content via the high-bandwidth FTS multicast prior to the start of a live presentation. A significant benefit provided by this approach is that the quality of the graphic content displayed on the attendee's monitor during the presentation is much higher than the graphic content produced using prior art presentation broadcast schemes. More specifically, the scheme implemented by the present invention transmits separate presentation slide content and live audio/video content to an attendee's computer such that a substantial portion of the display on the attendee's monitor closely replicates the original presentation slides, which are displayed in conjunction with the live presentation. At the same time, a small portion of the screen (dependant on whether the live presentation is broadcast using video equipment) is used to display a real-time video image of the presentation. In addition, if audio equipment support is provided, the audio portion of the live presentation is replicated in real-time through the sound subsystem in the attendee's computer.

This substantial improvement in the quality of presentation broadcasts is enabled by sending the HTML presentation slide file content separately from the audio/video content ASF stream. However, in order to provide this benefit, it is necessary that the HTML presentation slide file content be received by the attendee's computer in advance of the time when the corresponding slides are actually viewed during the live presentation. Each presentation slide is saved as a separate HTML file, corresponding to an Internet Web page. When using a relatively slow connection (e.g., 56 Kbps), a substantial time is required to download a web page comprising a large graphic image, such as a presentation slide. However, if the Web page (or slide) is already cached in the browser's cache, the Web page (or slide) can be loaded almost immediately. Transferring the HTML presentation slide content in advance of the live presentation ensures that the HTML content can be cached to enable the presentation slides to be quickly viewed on the viewer's display during the presentation in response to script commands embedded in the ASF stream.

Although the foregoing scenario is preferable, there will always be some prospective attendees who disregard their e-mail notifications, and visit the lobby page just prior to (or after) the start of the live presentation. In these instances, the attendees may not receive all of the HTML slide file content via the high-bandwidth FTS multicast prior to the start of the presentation. This problem is addressed by providing a multicast broadcast of the low-bandwidth FTS file during the presentation. Just prior to the start of the presentation, the attendees' browsers receive a trigger that automatically links the browsers to a predetermined URL, corresponding to a Web page that is different than the Lobby page. Once the browser is linked to the new Web page, the high-bandwidth FTS file can no longer be received so that the bandwidth it previously consumed is made available for receiving the ASF stream during the presentation. Accordingly, this new Web page has an embedded control that enables the attendees' browsers to receive the multicast broadcast of the low-bandwidth FTS file. For those instances in which an attendee does not receive all (or any) of the HTML slide file content via the high-bandwidth FTS multicast while browsing the Lobby page, a portion of the attendee's connection bandwidth is used to receive HTML slide file content via the low-bandwidth multicast broadcast of the low-bandwidth FTS file during the presentation. The embedded control can be loaded at any time prior to its use, and is preferably done while the attendee is browsing the Lobby page. Since the majority of the attendees' connection bandwidth must be reserved for receiving the ASF stream corresponding to the live audio and video content of the presentation, only a limited part of the bandwidth will be available for receiving the FTS files during the presentation. Therefore, the low-bandwidth FTS file is broadcast using a much smaller portion of the available bandwidth than used prior to initiating the live presentation.

After the high- and low-bandwidth FTS file broadcasts are initiated, the global.js file is updated in a block 1266. Once the ASF stream is created, an identifier is assigned to it. This identifier is placed in an active stream redirector (ASX) file that is used to redirect the attendees' browsers to link to the multicast broadcast source that is used to broadcast the ASF stream during the live presentation. The updated global.js file now includes a variable that contains a link to the ASX file. At this point, the "behind the scenes portion" of the presentation broadcast preparation has been completed, and a check will be placed adjacent to the "preparing presentation for broadcast . . . " text in presentation broadcast dialog 1200 (FIG. 14).

Upon completion of the foregoing steps, the presenter may check the audio and/or video subsystems that are to be used during the presentation, as indicated by block 1268. Arrow 1202 in presentation broadcast dialog 1200 will then be moved downward to a position adjacent to "microphone check . . . " text 1204. At this point, a microphone check is performed to determine if the audio subsystem is working properly by checking the audio signal from the microphone and enabling the volume level to be adjusted, if necessary. This check will bring up a dialog (not shown), which contains a progress bar (used to indicate a relative speech level) and a volume adjustment slide control. The user is prompted by the dialog to say, "I am using the microphone setup wizard. It is checking to see whether my microphone is plugged in and working properly." The user should speak at a normal level so that the system can adjust the volume level based on the peaks it measures when the user speaks the phrase noted above. The user should also verify that the progress bar changes length while speaking. When the audio subsystem check is complete, a check is placed next to "microphone check . . . " text 1204. The user may choose to recheck the audio subsystem by activating a recheck microphone button 1206, which is disabled (grayed) until the original audio subsystem check is completed.

If the user has indicated that video will be used (in the presentation broadcast settings dialog above), a video check dialog (not shown) will next be presented, to enable the video subsystem to be checked and adjusted. The video check dialog enables the user to adjust the video image with various controls, including slider controls for brightness, contrast, saturation, hue, and gain. Another dialog concurrently presented includes the video image that is presently being received to enable the user to more easily adjust the video image controls. These adjustments will be limited by the raw data that is produced by the camera. After the user has adjusted the video controls, an OK button can be selected to return the user to the presentation broadcast dialog. A check is then placed next to "camera check . . . " text 1208 to indicate that the check of the video subsystem has been completed. The user may recheck the video subsystem by activating a recheck camera button 1210, which will be disabled (grayed), until the initial camera check is completed.

The user may inform the audience if there are any problems encountered during the setup by activating an audience message button 1212, which enables the user to send one-line messages to the audience. The messages are posted on the lobby page, which may be previewed by selecting a preview lobby page button 1214. Details of how the system sends the audience messages are presented below.

After the system checks are complete, the user can initiate the presentation broadcast by activating a start button 1216. This button is disabled until the system checks are completed. The NETSHOW encoder is restarted, as shown by a step 1270 of FIG. 13. At a step 1272, the broadcast begins by broadcasting the ASF streaming audio/video content of the live presentation directly to the attendees' computers (if a NETSHOW server was not selected), or to the selected NETSHOW server. If a NETSHOW server is being used (either on a local LAN or through a third-party provider), the NETSHOW server transmits the audio/video content of the presentation (that it has received from the presenter's machine) to the attendees via the ASF stream. As discussed below, as the presenter advances through the slides of the presentation, script commands are embedded into the ASF stream to trigger display of the HTML slide files that were previously saved in the browser cache on each of the attendee's computers, so that the display of such slides are synchronized with the discussion and display of corresponding slides in the live presentation.

After the presentation broadcast is finished, an attendee can replay the presentation broadcast if the presenter chose to save the presentation broadcast (by checking the record presentation broadcast checkbox on the presentation broadcast settings form (FIG. 5)).

Broadcasting Via a Third Party NETSHOW Provider

The user also begins a third party NETSHOW™ provider presentation broadcast by selecting the "Online Broadcast→Begin Broadcast" menu item from the "Slide Show" top-level dropdown menu in POWERPOINT. At this point, POWERPOINT's user interface is suppressed, and the presentation broadcast slide files are saved as HTML files to the previously-selected presentation broadcast directory, the location of which was previously passed to the third-party provider through the global.js file. The third-party provider is then informed that the user wants to initiate the process for broadcasting the presentation and then uploads the HTML slide files for the presentation broadcast. The high- and low-bandwidth FTS files are created, the NETSHOW encoder checks are performed, and the audio and video checks are performed generally as discussed above. The presenter may then initiate the presentation broadcast by selecting the start button.

At this point the browser is launched with a Status="Begin" query string so that the Microsoft.com ASP page can appropriately switch it's user interface and links to send the user to the "begin presentation broadcasting page" of the third party provider. POWERPOINT then responds to a WINDOWS system message, 0x041E (1054 decimal), which is sent by the third party provider web page to signify that the provider is ready to begin the presentation broadcast. Upon receiving this message, POWERPOINT starts in presentation broadcast mode and begins streaming audio/video content to the third party via its internal WINDOWS Media Encoder. The third party broadcasts the HTML presentation slide content it has already uploaded using the high- and low-bandwidth multicast broadcast mechanisms discussed above, and also broadcasts the streaming audio/video content it receives in real time on the NETSHOW server to attendees who link their browsers to the URL assigned for the presentation broadcast. As is the case when using a local NETSHOW server, the streaming audio/video content contains embedded script commands that indicate when individual slides should be displayed during the presentation broadcast. When the presentation broadcast is completed, a "SlideShow Ended" event is sent to the third party provider so that the provider can end the presentation broadcast.

Sending Audience Messages

As discussed above, the user may inform the audience if there are any problems or send other information by activating audience message button 1212 on the broadcast presentation dialog shown in FIG. 14. Activating this button will bring up a dialog, which provides an edit control that enables the user to write a message that is posted on the lobby page.

Normally, in order to pass a message to a loaded web page, a developer would pass the message to a Java or ActiveX control that is built into the web page. However, this function would require the audience members to use a browser that supports Java and/or ActiveX, which is undesirable. Thus, an alternative solution was developed.

Figure 16:
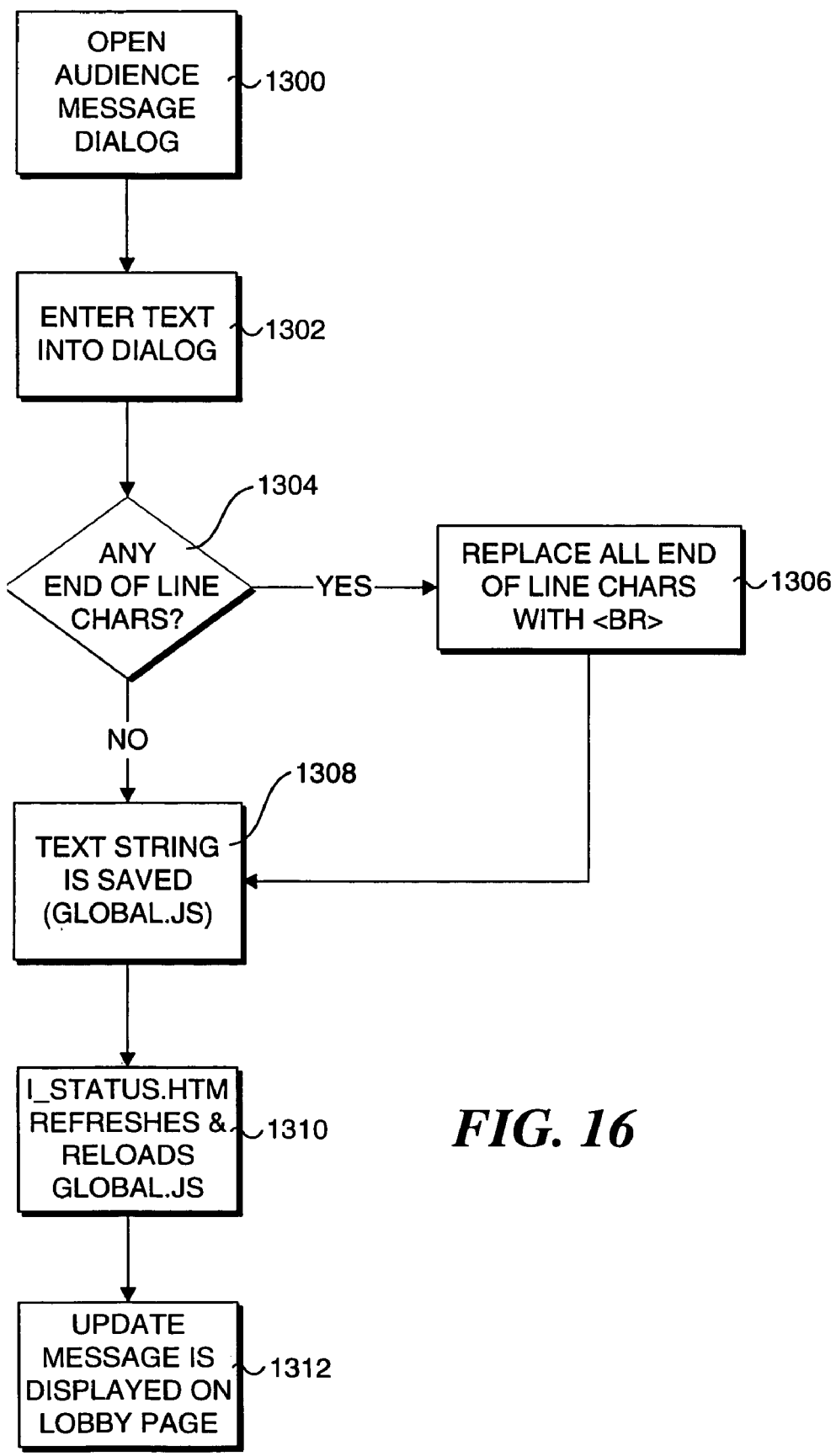
FIG. 16 is a flowchart illustrating the logic employed when sending an audience message to a lobby page that is viewed by an audience prior to the start of a presentation broadcast.
Figure 17:
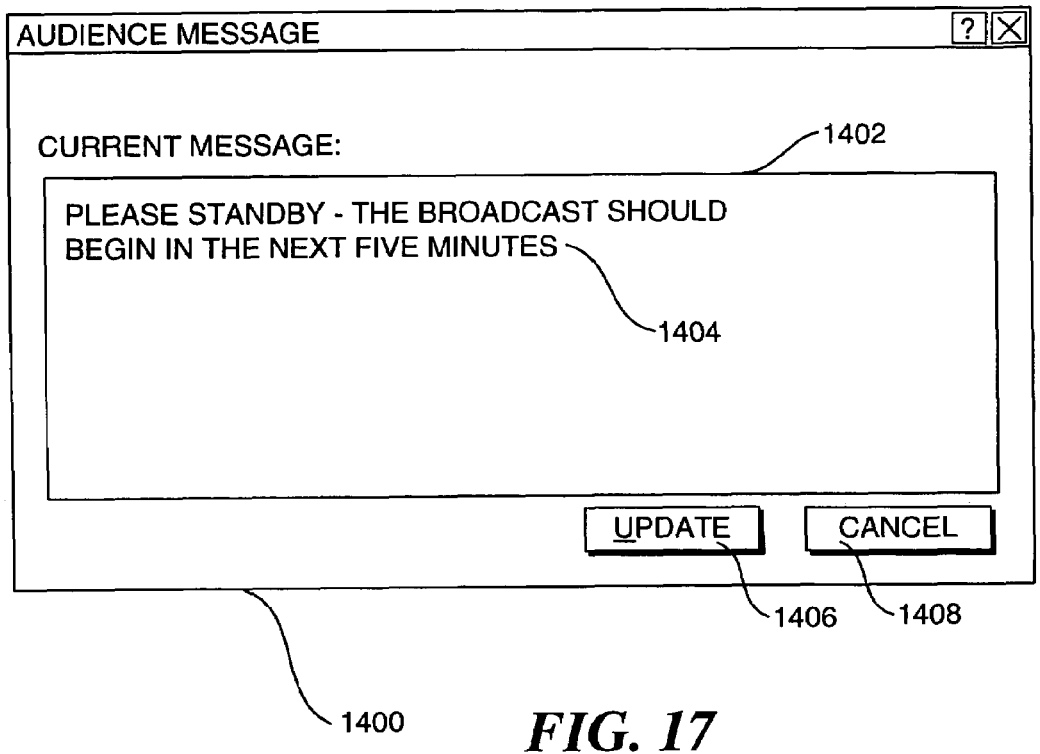
FIG. 17 is a dialog for creating audience messages to be sent to the lobby page.

As shown in FIG. 16, the process begins in a block 1300, wherein a user activates the audience message button on the broadcast presentation dialog, launching an audience message dialog 1400, which is shown in FIG. 17. The audience message dialog comprise a multi-line edit control 1402, in which a text message 1404 is entered, an update button 1406, and a cancel button 1408. The user enters the current audience message (only one message is posted at a time) in the edit control, as indicated by a block 1302 and then activates the update button, which saves the message as a text string to send the message to the lobby page. Optionally, the user may choose not to send a message by activating the cancel button.

Once a message to be sent has been selected, POWERPOINT parses the text string that indicates whether any End of Line characters are present, as indicated by a decision block 1304. If the answer is yes, the logic flows to a block 1306, which replaces any End of Line characters in the text string with "<BR>" (represents a line break under HTML). The text string is then written to the global.js file in a block 1308. The global.js file holds a series of name-value pairs, one of which is a variable and string value corresponding to the update message. Block 1306 is bypassed if there are no End of Line characters in the text string.

Figure 18:
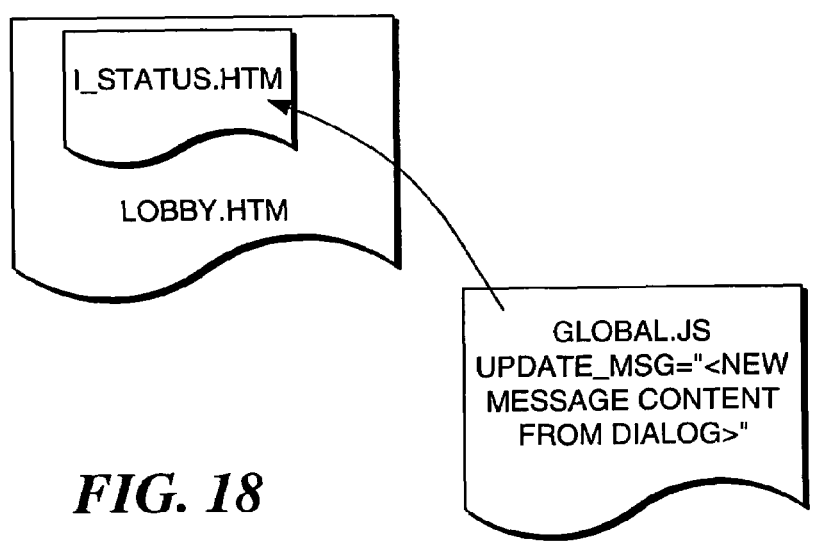
FIG. 18 illustrates the relationship between the lobby page and an embedded I_status page used for updating the audience message.

The architecture of the lobby page loaded by the audience is shown in FIG. 18. The global.js file is linked to an L_status.htm HTML file, which is framed by the lobby page file (lobby.htm). When any audience member chooses to view the lobby page, the outer HTML page (lobby.htm) is loaded, which loads the inner HTML page, L_status.htm. L_status.htm in turn loads the global.js file and all of its name-value pairs. L_status.htm contains refresh code that reloads the page periodically. The refresh period can be set to any length; in this instance, it is set to two seconds. Upon each refresh, the global.js file is reloaded, enabling any update message saved in the global.js file to be read in by L_status.htm, which processes the message so that it is displayed on the lobby page, as shown in a block 1310 and a block 1312, respectively. As L_status.htm is reloaded and the updated global.js file is read, L_status.htm uses innerhtml to set the variable value to the string value written into the global.js file.

Driving Presentation Slide Displays and Animations Remotely

As discussed above, it is necessary to advance the presentation of the various slide show slides on the attendees' computers from a remote machine. In order to perform virtual scenarios such as a one-to-many presentation, a presenter must be able to remotely execute commands on the audience machines to advance the presentation or to execute animation effects. For example, if two users browse the same web page, they are viewing two distinct copies of the same web page. In order for one user to control the web page viewed by the other, some communication needs to occur between them. The communication is accomplished through a combination of two technologies: embedding script commands in an ASF stream, and animations in the POWERPOINT HTML files (i.e., the cached presentation slides). POWERPOINT is thus able to send events via an audio/video stream to the online attendee, and the events trigger commands on the attendee's computer that effect actions on the web pages displayed on the attendee's computer.

Figure 19:
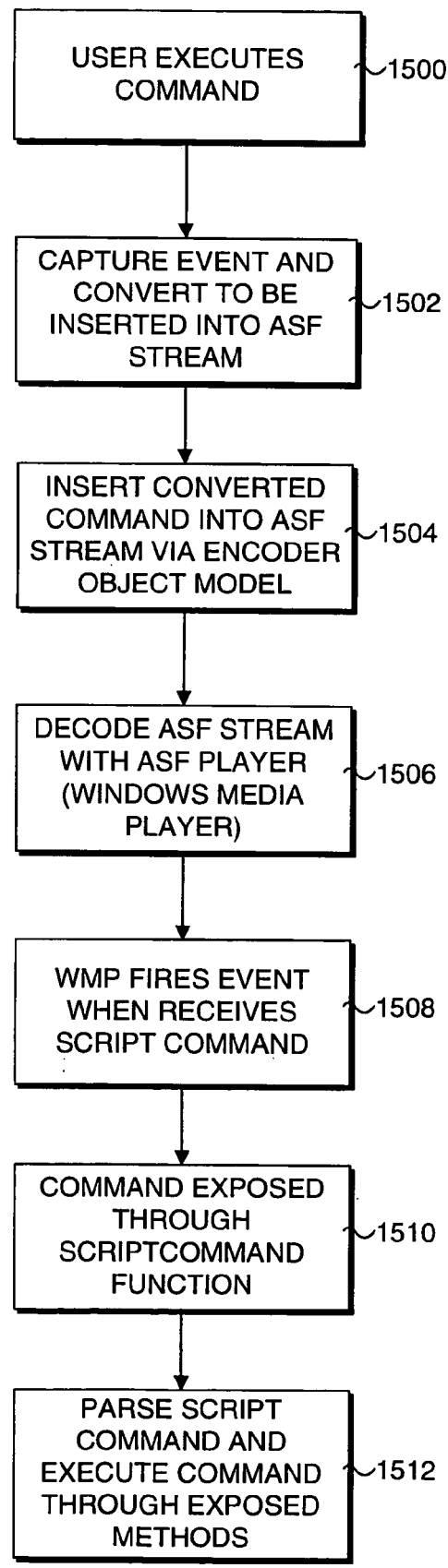
FIG. 19 is a flowchart illustrating the logic employed when driving the display of slides and animations in a presentation broadcast from a remote location.

As shown in FIG. 19, the process begins in a block 1500, wherein a user executes commands in POWERPOINT, such as triggering the next animation. This step generates an event, which is captured using the application object model and converted to a syntax that can be inserted in an ASF format, as indicated by a block 1502. The syntax for the format is generally of the form: Label Parameter, where the number of Parameters after Label are generally unrestricted. In the case of POWERPOINT animations, the syntax is of the form PPTCMD 1 1.

Using the object model of the encoding server (the WINDOWS™ Media Encoder), the converted event is inserted into the ASF stream in a block 1504. The ASF stream is sent to the ASF client player on a web page. On the client machine, the ASF client (preferably the WINDOWS™ Media Player) receives and decodes the ASF stream, as shown by a block 1506. The WINDOWS™ Media Player or other client then executes an event when it receives a script command in a block 1508. The script command is exposed through a function called ScriptCommand in a block 1510. ScriptCommand is a parser comprising a block of javascript or Visual Basic script (vbscript) code that takes the Label and passes the Parameters to another block of code. Once parsed, the Parameters can be used to trigger the command that corresponds to the Label. In a block 1512, various commands can then be executed through code comprising javascript, vbscript, or the object model of the browser, which operate on methods that are exposed by the HTML and script files to drive the animations. The animations are stored in the .js set of pages in the batch of HTML, .js, and image files that make up the web application.

Recording a Presentation Broadcast for on Demand Playback

As discussed above, there will be many instances in which people will not be able to attend the live presentation due to scheduling conflicts. Accordingly, the present invention provides a scheme for recording and playback of the presentation so that viewers can "attend" the presentation "on demand" after the presentation has been performed.

Figure 20:
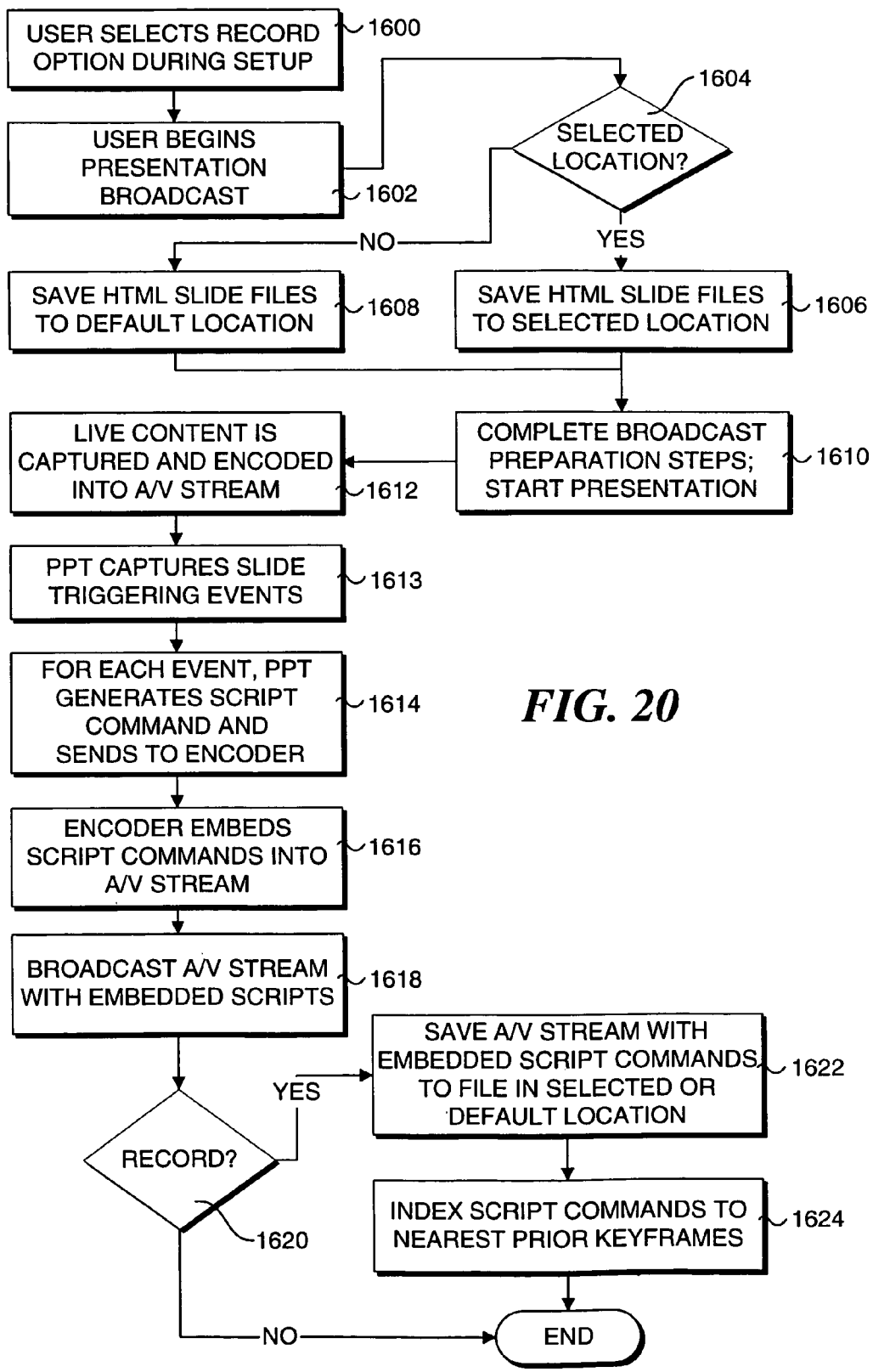
FIG. 20 is a flowchart illustrating the logic employed when recording a presentation broadcast.

With reference to FIG. 20, the process for recording a live presentation for on-demand viewing begins in a block 1600, in which a user selects the record broadcast option by selecting (i.e., checking) checkbox control 340 on presentation broadcast setting tab 318 (FIG. 5). As discussed above, the user may select a particular location at which to archive (i.e., save) the content of the recorded presentation (HTML slide files and audio/video ASF stream) by activating a browse button 344. Selecting the browse button will enable the user to identify the location within the user computer's file system. The selected location will be shown in save location field 342. In addition, selecting the browse button automatically checks checkbox control 340 (if it isn't already checked). If the user doesn't activate browse button 344 to select a particular location to save the files, the recorded presentation content files will be saved in a default location that is defined in the system registry. As discussed above, the value in save location field 342 specifies only the location of the archive, not the complete archive file name. When the archive is created, it will be named using the following format: <NAME><XXXXYYZZAABBCC>.asf where <NAME> is the file name and XXXX refers to the year, YY the month, ZZ the day, AA the hour, BB the minute, CC the seconds, e.g., My Presentation19990427080104.asf.

Next, in accord with a block 1602, the user begins the presentation broadcast as usual by activating the "Slide Show→Online Broadcast→Begin Broadcast" menu selection from POWERPOINT's main menu. This causes the broadcast preparation steps discussed above with reference to the flowchart of FIG. 13 to be performed. Recall that the first preparation step is to save the HTML slide files. Accordingly, the logic flows to a decision block 1604, in which a determination is made to whether the recorded presentation files are to be stored in a selected location. If the answer is yes, the logic flows to a block 1606 in which the HTML slide files are saved in the selected location. If the answer is no, the HTML slide files are saved to the default location in a block 1608. After the HTML slide files are saved, the remainder of the broadcast preparation steps are performed in a block 1610, and the live presentation is started, as discussed above.

Next, in a block 1612, the live content of the presentation is encoded into an audio/video (A/V) stream using the ASF format in a manner similar to that described above in regard to broadcasting the live presentation. At the same time, in accord with block 1612, the slide triggering events are captured by POWERPOINT as they occur during the presentation, and corresponding slide display script commands are generated and sent to the encoder in a block 1614. The script commands are then embedded into the audio/visual (A/V) stream corresponding to the live content of the presentation using an interleaving scheme, as indicated in a block 1616. The A/V stream is then broadcast in the manner discussed above, in accord with a block 1618.

The logic then flows to a decision block 1620, wherein a determination is made to whether the broadcast is to be recorded. If the answer is yes, the A/V stream is saved to the selected or default archive location (as appropriate) in a block 1622. After the live presentation is completed and the audio/video stream is saved, the script commands are indexed to the nearest prior keyframes in a block 1624, as described below. The recording process is then complete.

Figure 21:
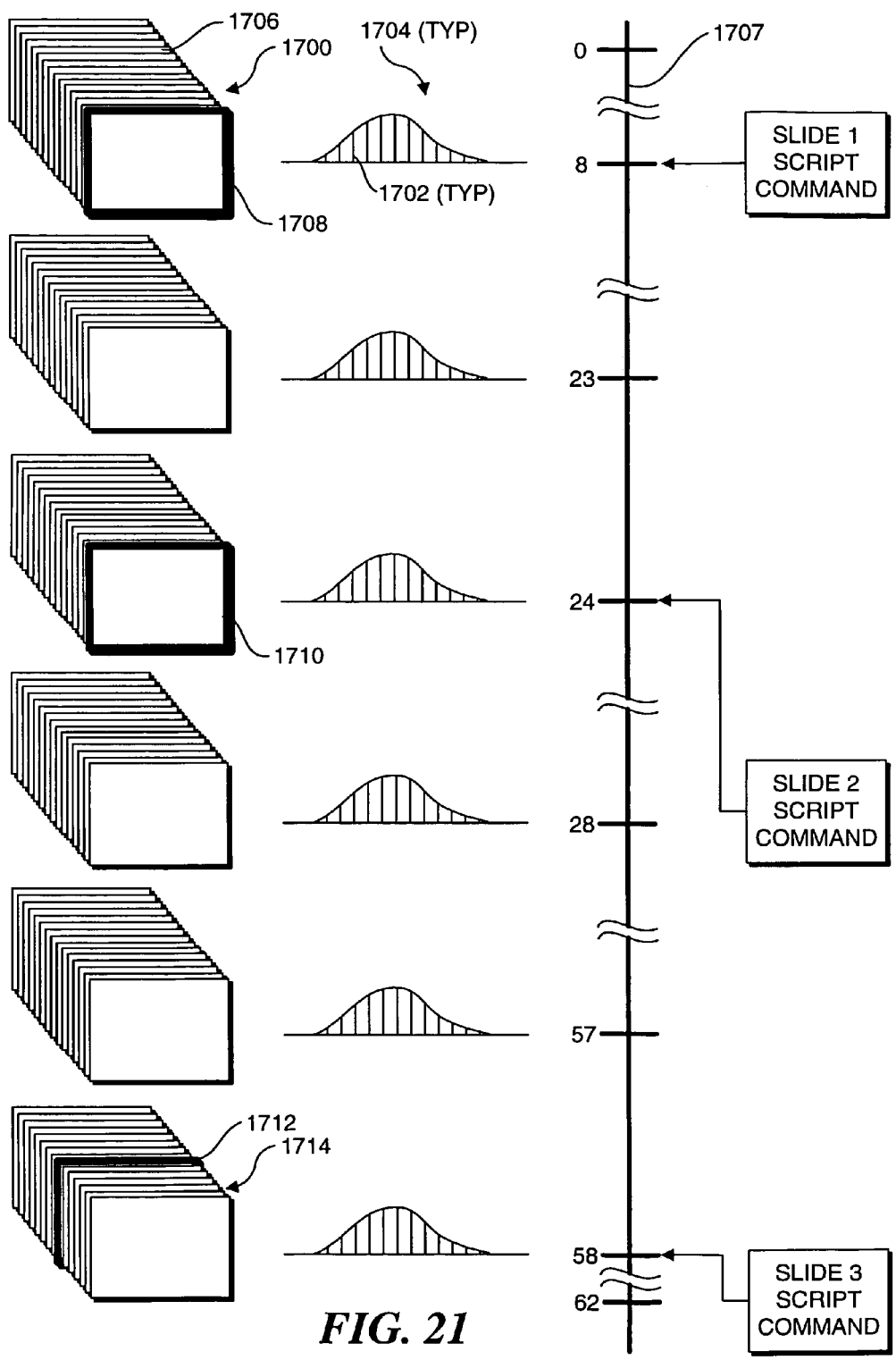
FIG. 21 is a schematic timing diagram illustrating how slide display script commands are indexed during a post-processing operation.

With reference to FIG. 21, the script commands are embedded and indexed in the following manner. As explained above, the live audio and visual content of the presentation is captured in real-time and encoded into the ASF stream of data. The visual content is captured as a plurality of visual samples corresponding to video frames 1700, and the audio content is captured as a plurality of audio samples 1702, collectively comprising audio waveforms 1704.

The visual content sampling rate (i.e., the video frame rate) will generally be set prior to the broadcast as a function of the available bandwidth and the level of motion that is expected to occur. For example, during many presentations, the only visual content that will be captured will comprise a frontal (i.e., head-on) view of the presenter. Since most presenters do not move their entire body around much while giving a presentation, a low-motion video frame rate, such as 15 frames per second, can be used. Thus, for this example, during each second of the presentation, fifteen visual samples will be captured and converted into corresponding digitized video frames that are sent to the encoder.

Concurrently with the video capture and conversion, audio samples are also captured, converted into digitized waveforms, and sent to the encoder. The audio sampling rate is significantly higher than the video sampling rate (e.g., 8,000 samples/sec); however, since each audio sample comprises only one (for mono) or two (for stereo) units of data (where, for example, each unit of data may comprise a 16- or 32-bit word), the encoded audio data generally comprises less than half of the data in the ASF stream when the stream comprises both audio and visual content.

In order to maximize use of the available bandwidth, the encoder must be efficient. Unless the bandwidth is extremely high, it would be impractical to encode (and decode at the receiving end) all of the visual content of each frame, even when the content is in a compressed format. Instead, for the vast majority of the frames, the encoder only adds data corresponding to the difference between the most recent frame and its immediately-preceding frame to the data stream. The frames that only contain differential data are commonly referred to as deltaframes, which are shown in the Figure as thin-lined frames 1706. As a result of this scheme, if the presenter is moving very little, each deltaframe will comprises very little data.

Unfortunately (from a replication standpoint), some presenters may animate their presentation with significant head and/or hand movements and facial expressions. If these motions are sufficiently rapid, the encoder must deal with a relatively large difference in data between sequential video frames. Whenever the encoder observes a large difference between the visual content of successive video frames, the encoder creates an entire new frame of data corresponding to the visual content of the last frame. These frames with new content are called keyframes and are shown in the Figure as dark-lined frames 1708.

There will be some instances in which very little motion will be observed during relatively-long time intervals (e.g., for more than 30 seconds). During such an interval, all of the frames would normally be deltaframes. However, since it is desirable to enable viewers to be able to skip portions of a recorded presentation (and otherwise move forward and backward within the presentation), it is preferable to periodically encode new keyframes so that when the playback of a recording is resumed, a keyframe is quickly encountered in the data. Accordingly, the encoder preferably generates a new keyframe at least every eight seconds.

During the presentation, each visual sample or video frame is time stamped using a global time scale to indicate when the sample was taken. Each audio sample is likewise time stamped in a similar manner. The time stamps enable the audio and visual content of the presentation to be synchronized during playback. As described above, as the slide triggering events are captured, slide display script commands are generated and embedded into the ASF stream in an interleaved fashion. As a result, each script command will have an inherent time stamp based on its location in the stream. (However, it should be noted that a time stamp is not appended to the script commands.)

An exemplary timing sequence is now described with reference to a timeline 1707 comprising various timing marks, as shown in the Figure. A frameset comprising 15 video frames, and a corresponding audio waveform is produced in accordance with each of the timing marks. In the timing sequence, a script command for triggering the display of slide 1 is embedded into the stream 8 seconds after the start of the presentation. As a result, this script command will have an inherent time stamp of 8 seconds. In a similar fashion, a script command for displaying slide 2 will have an inherent time stamp of 28 seconds, and the script command for displaying slide 3 will have an inherent time stamp of 62 seconds. Assuming that a first keyframe (not shown) is encoded at 0 seconds (note that the first video frame will always be a keyframe), a keyframe 1708 is automatically encoded at 8 seconds, a keyframe 1710 is automatically encoded at 24 seconds, and a keyframe 1712 is encoded in accord with the sixth frame of a frameset 1714, due to motion of the presenter, which occurs at approximately 58 seconds.

In a preferred implementation of the present invention, each script command will be indexed so as to be synchronized with the nearest prior keyframe during a post-processing operation on the saved ASF stream file. This indexing of the script commands is performed as follows. First, a time index with a one-second granularity or resolution is encoded into the data stream, when the data stream is originally produced. Next, the keyframes are assigned a time index value based on their respective time stamps. Finally, each script command is indexed to the nearest prior keyframe time index value based on the script command's inherent time stamp location in the ASF stream. As a result of applying these steps to the foregoing exemplary events, the script command corresponding to slide 1 will be indexed to a time index value of 8 seconds since the nearest prior keyframe time index value corresponds to an 8 second time index value. Similarly, the script command corresponding to slide 2 will be indexed to a time index value of 24 seconds (its nearest prior keyframe time index value), and the script command corresponding to slide 3 will be indexed to a time index value of 58 seconds (its nearest prior keyframe time index value).

On Demand Playback

Figure 22:
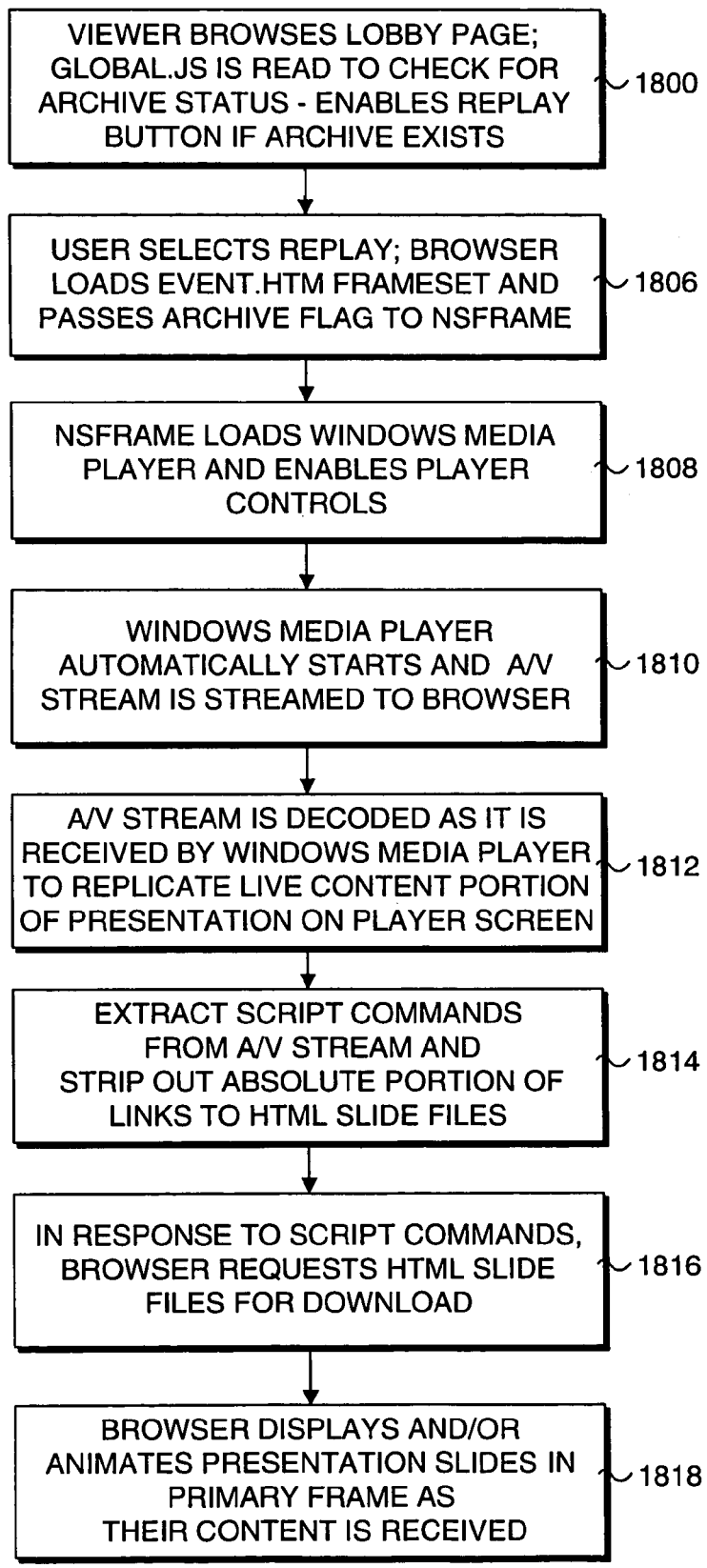
FIG. 22 is a flowchart illustrating the logic employed when viewing an on-demand playback of a recorded presentation.
Figure 23:
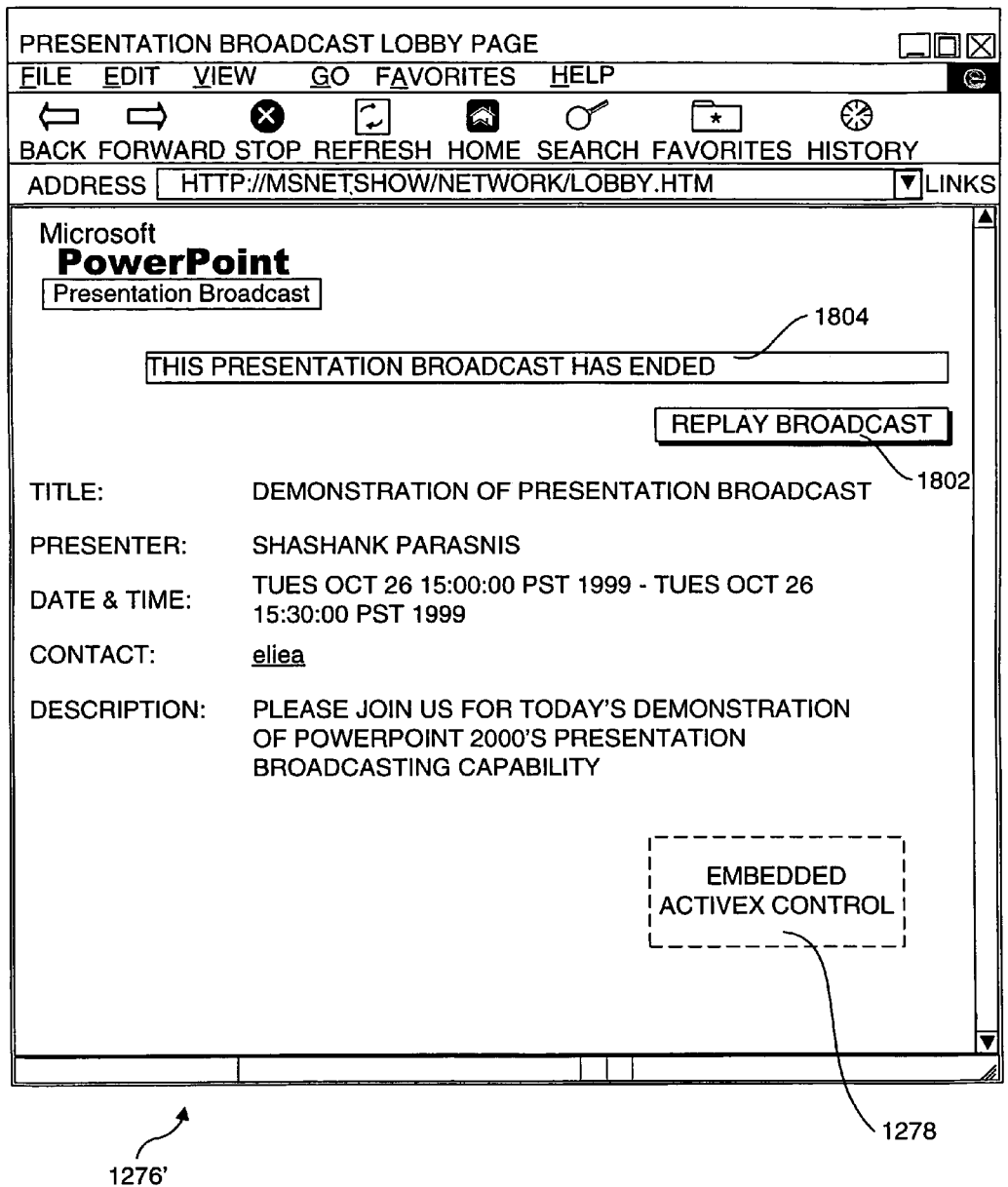
FIG. 23 is an exemplary browser page corresponding to an on-demand playback of a recorded presentation.

Once a live presentation is recorded in this manner, attendees who could not attend the live presentation may view a replay of the presentation on demand. With reference to FIG. 22, a user initiates an on-demand playback of the recorded presentation by browsing the lobby page, as shown by a block 1800. This time, when the lobby page is loaded, an embedded ACTIVEX™ control 1278 reads the global.js file, and an archive status flag is detected that indicates the presentation is over and a recording of the presentation exists. In response to this archive status flag, a lobby page 1276' similar to that shown in FIG. 23 will appear, a "Replay Broadcast" button 1802 in this page will be enabled, and a textbox 1804 will be displayed with text indicating the presentation is over. "Replay Broadcast" button 1802 is created as follows.

<button language="javascript" name="ReplayButton" id="ReplayButton"

STYLE="cursor: hand;color black;padding: 2;font-size: 8pt;position:absolute;

left: 750; top: 100; height:25" onclick="location.href= 'event.htm#archive';">

</button>

Figure 24:
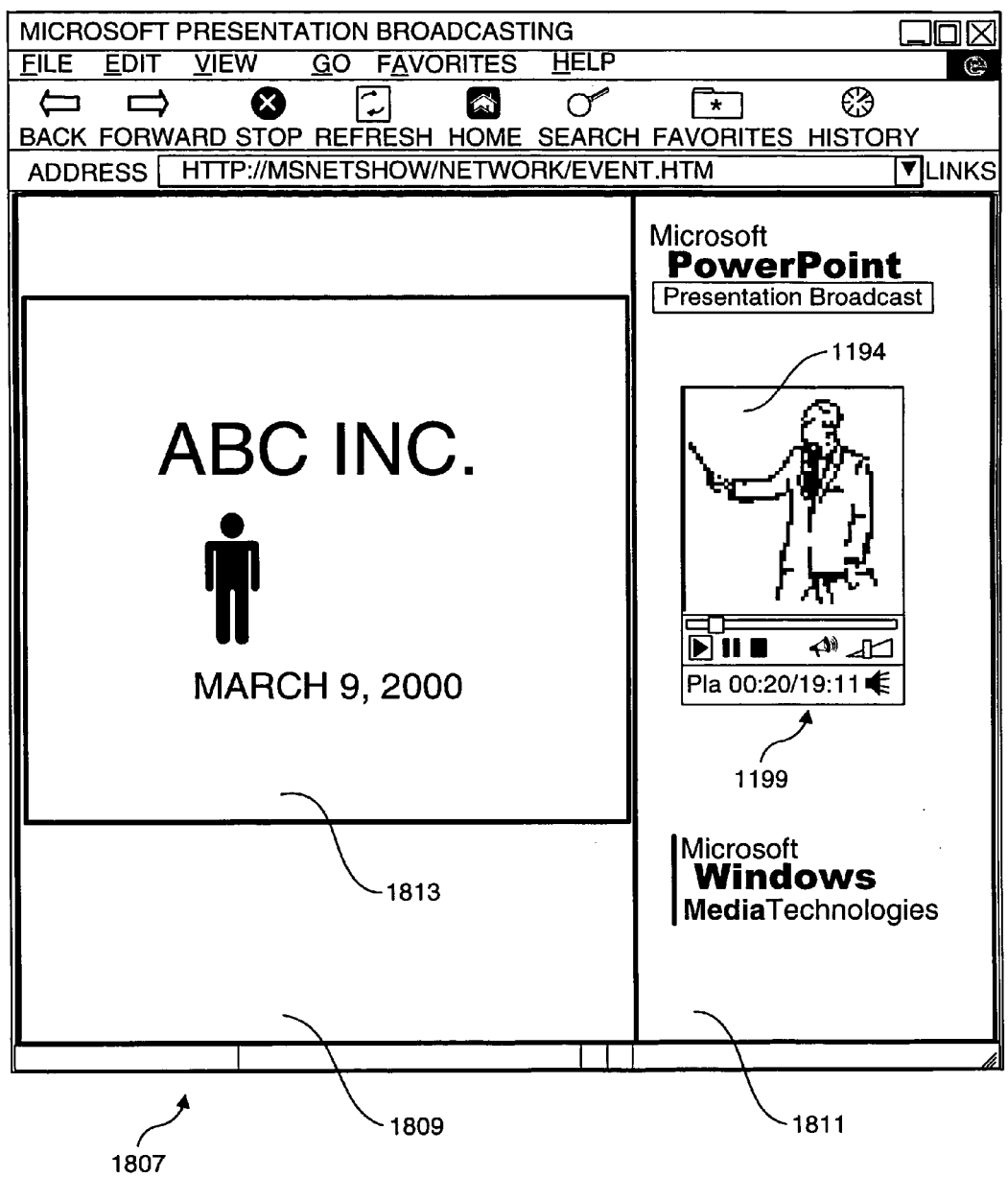
FIG. 24 is a representation showing how the lobby page of FIG. 15 appears when a completed presentation has been recorded and archived.

Next, the user will activate "Replay Broadcast" button 1802 in a block 1806, causing the browser to load an event.htm frameset that produces a corresponding browser display 1807, as shown in FIG. 24. The event.htm frameset comprises a primary frame 1809 and a child frame 1811, corresponding to a page called nsframe.htm, which includes the following code segment for capturing an archive flag that is used to direct nsframe.htm to load the appropriate audio/video ASF file.

```
If ((parent.location.hash == "archive") || (parent.location.hash == "#archive"))
{
        var REPLAY_ARCHIVE = 1;
}
else {
        var REPLAY_ARCHIVE = 0;
}
```

If the REPLAY_ARCHIVE flag is set (i.e., equals 1), nsframe.htm loads the WINDOWS™ Media Player, enables the player controls in a block 1808, and automatically starts download and playback of the audio/video ASF file in a block 1810, using the following code.

```
If (REPLAY_ARCHIVE == 1) {
        NSPLAY1.FileName = ARCHIVE_URL;
        NSPLAY1.VideoBorderWidth = "0";
        NSPLAY1.ShowPositionControls = "0";
        NSPLAY1.Show Controls = "1";
        NSPLAY1.EnableTracker = "1";
        NSPLAY1.ShowStatusBar = "1";
}
Else {
        NSPLAY1.FileName = ASX;
        NSPLAY1.VideoBorderWidth = "0";
        NSPLAY1.ShowControls = "0";
        NSPLAY1.ShowTracker = "0";
        NSPLAY1.EnableTracker = "0";
        NSPLAY1.ShowPositionControls = "0";
}
```

The audio/video ASF file to playback is defined in the global.js file, in the following format:
ARCHIVE_URL="MidBroadband Review_broadcast19900114155833.asf"

This name of the audio/video ASF file is saved in the directory (i.e., save location) specified above during setup. As further described below, it is preferable that the user not enter the location of the directory in which the audio/video ASF file is to be saved, but instead, allow the file to be saved in the default directory.

As the A/V ASF stream is played by the WINDOWS™ Media Player, it is decoded and processed to produce a replication of the visual and audio aspects of the live presentation, in accord with a block 1812. Visual content 1194 is replicated on the display portion of WINDOWS™ Media Player control 1199, while the audio content is replicated through the sound system on the user's computer.

In a block 1814, each slide display script command is extracted from the A/V stream and decoded concurrently with the decoding of a corresponding keyframe to which the script command is indexed. The absolute portion of the URL reference link to the HTML slide file that corresponds to the script command is then stripped away to yield a relative reference to the HTML slide file, as follows.

As discussed above, each script command contains instructions for displaying and/or animating a presentation slide, which is stored as an HTML slide file. Included in these instructions is a URL reference that is used to link that browser to a location (i.e., network address) from where the HTML slide file can be downloaded over a computer network, such as the Internet. The URL reference for each HTML slide file is determined and added to its corresponding slide display script command when the slide display script commands are generated during the recording process.

At this point, the URL reference includes an "absolute" reference to the location at which the HTML slide file is stored, such as "http://windowsmedia.microsoft.com/<slidename>." In general, Internet URL references comprise an absolute base address portion that is commonly referred to as a domain name, such as "http://windowsmedia.microsoft.com/," and a relative portion, which may comprise the portion of the URL reference after the base portion (e.g., <slidename>, as would be the case in the foregoing example), or may comprise the location of a file relative to a nested directory within the network domain.

While absolute references are integral to network communication, they present a problem with respect to their inherent inability to link to files that have been moved. For example, suppose that a particular set of HTML slides files (e.g., slide0001.htm, slide0002.htm, etc.) are moved from an original directory on the "http://windowsmediamicrosoft.com" network domain of "/archive" to "/examples/archive0001." In this case, the original URL references will not link the browser to the HTML slide files.

To address this shortcoming, the present invention employs a relative referencing scheme that enables network administrators and others to move archived recordings of presentations and their associated HTML slide files and Lobby pages without adversely affecting the ability to thereafter connect to the files. As discussed above, the location of the recorded A/V ASF file is provided to nsframe.htm via the archive flag. A relative reference identifies the location of the A/V ASF file relative to the location of the Lobby page, the latter being associated with an absolute URL reference. If the HTML slide files are saved in the same directory as the A/V ASF file, there is no need to use an absolute URL reference to identify the location of each HTML slide file, so long as the location of the Lobby page is known. Instead, only a relative reference to the other files is needed. By using this scheme, the A/V ASF file, HTML files, and the Lobby page file can be moved to new locations as long as their relative locations within the directory structure are maintained, and the location of the directory of the Lobby page is provided. Preferably, all of these files will be saved in the same directory.

Returning to the flowchart of FIG. 22, in response to each slide display script command, the browser requests the script commands corresponding HTML slide file to be downloaded based its relative reference, as shown by a block 1816. The following code segment allows nsframe.htm to request download of the HTML slide files to the browser using relative referencing:

```
if (TypeOfCommand.toUpperCase( ) == "URL")
{
        Param = makeRelative(anyParam);
    If (((makeRelative(unescape(parent.SlideDisplay.location.href)))
    != Parm) &&(Param))
        Parent.SlideDiplay.location.href = Param;
}
```

Finally, as the HTML content of each HTML slide file is downloaded and interpreted by the browser, a corresponding presentation slide (such as presentation slide 1813) is displayed and/or animated in primary frame 1809, in accord with a block 1818.

This scheme displays and/or animates that presentation slides based on the keyframe indexes such that the presentation slides are substantially synchronized with the replicated audio and video content, thereby replicating the live presentation as it would have been experienced if attended when originally presented. It is noted that since the HTML slide files are downloaded upon request, there will be a small time lag between when they are actually displayed and/or animated, which would not exist if they were already cached by the browser, as described above in regard to receiving a broadcast of the presentation when it was presented. This time lag will depend on the available bandwidth for the communications with the viewing computer and the complexity of the graphic content of each particular presentation slide, but will generally comprise only a few seconds or less.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

APPENDIX

Interface Specification

IDispatch & IErrorInfo

All interfaces support Idispatch, which has a built-in IErrorInfo support. This approach will provide an easy way to test the interface, or incorporate into another applications. For the first release, we will not support dual interface.

Events

For many occasions, the session object on the server will notify the client with an event that causes the session status to change. These events are defined as a enum here.

```
typedef enum NSL_EVENT
{
    NSLEV                            = 0,
    NSLEV_PROPERTY_CHANGED,
    NSLEV_UNAUTHORIZED_CHANGED,
    NSLEV_SESSION_CREATED,
    NSLEV_SESSION_DELETED,
    NSLEV_SESSION_STARTED,
    NSLEV_SESSION_STOPPED,
    NSLEV_SERVER_ERROR               = 999
} NSL_EVENT;
```

| Event | Description |
| --- | --- |
| NSLEV_PROPERTY_CHANGED | A property has been changed. You will get this event when you call CreateSession or RecreateSession as well as changing properties after the session has been created. |
| NSLEV_UNAUTHORIZED_CHANGED | A property has been changed without the author's knowledge.. You will get this event when the NetShow administrator changes some property of the station, program, or stream that belong to this session on the server. This is potentially dangerous because some properties are coordinated between all components. This may cause it to be out of sync. The session may not operate properly. |
| NSLEV_SESSION_CREATED | The session has been created. This would be an expected response of CreateSession call, if it has been created successfully. You will not get this event when you call RecreateSession because the session has already been created. |
| NSLEV_SESSION_DELETED | The session has been deleted. You will get this event when the session has been deleted successfully by call DeleteSession. You will also get this event when a NetShow administrator deletes a station, program or stream that belongs to this session on the server. |
| NSLEV_SESSION_STARTED | The session has started. You will get this event when the session has started by calling StartSession. You will also get this event when a NetShow administrator starts the stream that belongs to this session on the server. |
| NSLEV_SESSION_STOPPED | The session has stopped. You will get this event when the session has started by calling StopSession. You will also get this event when a NetShow administrator stops the stream that belongs to this session on the server. |
| NSLEV_SERVER_ERROR | There was an error on the server and the client has lost connection to the server. Most likely, the service has been stopped. You should save the session information and recreate the session later. |

IASFSession

| Property | Description |
| --- | --- |
| Control | Access to the INSLiteSession interface of the object. This is a read-only property. |
| Property | Access to the IASFSessionProp interface of the object. This is a read-only property. |

| Event | Description |
| --- | --- |
| StatusChanged | The session status has changed. The long status parameter identifies the cause of the changes (NSL_EVENT). |

IASFSessionProp

All required properties must be set before the session can be created. If you query the property that has not been set (empty), you will get the result of E_FAIL.

| Property | Description |
| --- | --- |
| Name (!) | The name of the session. The default is null. If specified, it must be unique among the sessions on the server, as well as globally in order to be able to recreate the session later. If not, a globally unique name is generated. |
| Title | The human-readable title of the session. The default is the same as Name property.<br>Note that the name will appear as 'Show' and 'Clip' title on the client's player. |
| Description | The textual description of the session. The default is null.<br>Note that the description will appear on the client's player. |
| Author | The author's name. The default is null. |
| Copyright | The copyright notice of the content. The default is null. |
| REX Address (*) | The IP address or the name of the machine where REX is running. The default is null.<br>This property must be set if you want the server to connect to REX directly. If this property is set, the REX Alias will be ignored.<br>This property must be set if Unicast Only is set. REX Alias cannot be used. |
| REX Port | The port on the machine to use to communicate with REX. The default is 7007 |
| REX Alias (* if no REX Address and not using Unicast Only) | The alias that is used to find the REX address. The default is null.<br>This property must be set if you want the server to connect to REX via the alias. If the REX Address is set, this property will be ignored.<br>This property is always ignored, if Unicast Only is set. In this cast, REX address must be set. |
| ASD UNC | The URL where the ASD file is used to configure REX. The default is null, which means the stream format is one of the SSF. This property is ignored if Unicast Only is set. |
| Base Directory (*) (!) | Directory path name, in UNC or local file format, where the system can generate and store files that must be accessed by the clients.<br>The NSC and the ASX files required by the session will be created here. The default is null (invalid). |
| Base URL (*) (!) | Base URL for the client to access, equivalent of the Base Directory property. The client will access the NSC and ASX files from this base URL. The default is null (invalid). |
| Client Log URL | URL that client can use to generate log of its activities and statuses. The actual logging is implemented by a cgi script behind this URL. The default is null (no log created). |
| Contact Address | The session's contact address. The default is null. |
| Contact Phone Number | The session's contact phone number. The default is null. |
| Contact Email | The session's contact email. The default is null. |
| Auto Archive | Specifies whether the content should be automatically archived. |
| Auto Archive Directory | Directory path name where the archive file is generated. Valid only when the Auto Archive property is set. The default is null, which is invalid when the Auto Archive property is set. |
| Auto Archive Size | The file size limit of the archive file. The default is 0 (unlimited). |
| Unicast Only (!) | The session will be unicasted only. The default is no. If set to yes, all multicast properties will be ignored. |
| Unicast Rollover (!) | Specifies whether to allow unicast rollover or not. The default is no. This property is ignored if Unicast Only is set.<br>Note that the unicast manager is assumed to be installed on the same machine as the NetShow services. |
| Multicast Address | The IP multicast address used for broadcasting. The default is null. If specified, it must be a valid multicast IP address, unique among other addresses used on the server. If not, an address will be generated. This property is ignored if Unicast Only is set. |
| Multicast Port | The port used for broadcasting. The default is null. If specified, it must be a valid port, unique on the IP address used on the server. If not, a port number will be generated. This property is ignored if Unicast Only is set. |
| Multicast TTL | The multicast time-to-live. The default is 1 (for Intranet). This is the number of 'hops' the multicast packets can make before reaching the destination. This property is ignored if Unicast Only is set. |
| Drop-Dead Time | The date and time when the session should already be done. If the session has not been deleted by then, the system will delete it. The default is null (24 hours after it is created). This property makes sure that the server can clean up if for some reason the user didn't. |

(*) Required property.
(!) Property cannot be changed after the session is created.

IFTSSession

| Property | Description |
|---|---|
| Control | Access to the INSLiteSession interface of the object. This is a read-only property. |
| Property | Access to the IASFSessionProp interface of the object. This is a read-only property. |

| Event | Description |
|---|---|
| StatusChanged | The session status has changed. The long status parameter identifies the kind of changes (NSL_EVENT) that has occured. |

IFTSSessionProp

All required properties must be set before the session can be created. If you query the property that has not been set (empty), you will get the result of E_FAIL.

| Property | Description |
|---|---|
| Name (!) | The name of the session. The default is null. If specified, it must be unique among the sessions on the server, as well as globally in order to be able to recreate the session later. If not, a globally unique name is generated. |
| Description | The textual description of the session. The default is null. |
| Author | The author's name. The default is null. |
| Copyright | The copyright notice of the content. The default is null. |
| Source Base URL (*) | The base URL or UNC where the slides are. Wildcards characters are allowed to defines the source file names. The default is null (invalid). Note that the files in the subdirectory, if any, will not be transferred. |
| Output Base URL (*) | The base URL that the client will recognize as when the files are finally transferred to the client machine. The source file names are used to complete the URL by concatenating with the base URL. The default is null. This property is used to pre-load the client's URL cache with these files. Note that this property must be set if you want the files to go into the URL cache on the client's machine. If this property is set, the Output Base Directory property will be ignored. |
| Output Base Directory (* if no Output Base URL) | The base directory in the client where the files will be transferred to. The default is %TEMP%, which means the files will go into the temporary directory of the client defined by the TEMP environment parameter. Note that this parameter is ignored if the Output Base URL property is set. |
| Redundancy Ratio | The percentage of how much data redundancy to be transferred. Using the unreliable transfer protocol, sending redundant data increase the probability that the client would get the data completely. In the intranet, where packet loses are minimal, this can be small. The default is 20%. |
| Data Bandwidth | The maximum data transfer rate. This is specified in Kbps. The default is 256. |
| Contact Address | The session's contact address. The default is null. |
| Contact Phone Number | The session's contact phone number. The default is null. |
| Contact Email | The session's contact email. The default is null. |
| Multicast Address | The IP multicast address used for broadcasting. The default is null. If specified, it must be a valid multicast IP address, unique among other addresses used on the server. If not, an address will be generated. |
| Multicast Port | The port used for broadcasting. The default is null. If specified, it must be a valid port, unique on the IP address used on the server. If not, a port number will be generated. |
| Multicast TTL | The multicast time-to-live. The default is 1 (for Intranet). This is the number of 'hops' the multicast packets can make before reaching the destination. |
| Drop-Dead Time | The date and time when the session should already be done. If the session has not been deleted by then, the system will delete it. The default is null (24 hours after it is created). This property makes sure that the server can clean up if for some reason the user didn't. |

(*) Required property.
(!) Property cannot be changed after the session is created.

INSLiteSession

HRESULT GetServerDateTime (DATE* pDate)

pDate  The pointer to the date and time, in GMT, returned from the server.

This method returns the current server date and time.
Return Value:

| | |
|---|---|
| S_OK | No error |
| E_FAIL | The system fails to provide date/time. |

HRESULT GetStatus (short* pwStatus)
pwStatus  The pointer to the status returned.

This method returns the object status. The status may be:

NSL_INACTIVE  The object is instantiated, but not associated with any session on the server.

-continued

| | |
|---|---|
| NSL_ACTIVE | The object is associated with a session on the server. The session is not broadcasting any streams. |
| NSL_STARTED | The object is associated with a session that is in the process of broadcasting the streams |

Return Value:

| | |
|---|---|
| S_OK | No error |

HRESULT CreateSession (void)

This method creates the session on the server according to the properties set on the object. The object status will change from NSL_INACTIVE to NSL_ACTIVE. Upon successful creation, you will get the NSLEV_PROPERTY_CHANGED event and then the NSLEV_SESSION_CREATED event.

Return Value:

| | |
|---|---|
| S_OK | No error |
| E_OUTOFMEMORY | The server is running out of memory. |
| NS_E_INVALID_REQUEST | The object is already active with a session. |
| E_INVALIDARG | The properties are not set properly. For example, required properties are not set. |
| NS_E_DUPLICATE_NAME | The session name is already in use. |
| WSAADDRESSINUSE | The multicast IP address and port is already in used. |

You may also get other NetShow specific error return value. Please check nserror.h.

| | |
|---|---|
| HRESULT RecreateSession (BSTR pszName) | |
| pszName | The pointer to the name of the session on the server |

This method regains the control and properties of the session that has been created previously by CreateSession method. The object status will change to NSL_ACTIVE. Previous association with other session will be lost. Upon successful recreation, you will get the NSLEV_PROPERTY_CHANGED event.

Return Value:

| | |
|---|---|
| S_OK | No error |
| E_INVALIDARG | The session is not found, or it was not created by this service, or the station, program or stream has been modified beyond recognition by this service. |

You may also get other NetShow specific error return value. Please check nserror.h.

| | |
|---|---|
| HRESULT FindSession (BSTR pszName) | |
| pszName | The pointer to the name of the session on the server |

This method finds the session that has been created previously by CreateSession method.

Return Value:

| | |
|---|---|
| S_OK | No error |
| E_INVALIDARG | The session is not found in the database. |

HRESULT StartSession (void)

This method starts broadcasting. The status of the object will change from NSL_ACTIVE to NSL_STARTED.

Return Value:

| | |
|---|---|
| S_OK | No error |
| NS_E_INVALID_REQUEST | The object is not active or the session is unicast only. You must call CreateSession or RecreateSession first and create a multicast session. |

You may also get other NetShow specific error return value. Please check nserror.h.

| |
|---|
| HRESULT StopSession (void) |

This method stops broadcasting. The status of the object will change from NSL_STARTED to NSL_ACTIVE.

Return Value:

| | |
|---|---|
| S_OK | No error |
| NS_E_INVALID_REQUEST | The object is not active or has already been started. You must call CreateSession or RecreateSession and start it first. |

You may also get other NetShow specific error return value. Please check nserror.h.

| |
|---|
| HRESULT DeleteSession (void) |

This method deletes the session from the server. If the session is broadcasting, it will stop. The status of the object will change from NSL_ACTIVE or NSL_STARTED to NSL_INACTIVE.

Return Value:

| | |
|---|---|
| S_OK | No error |
| NS_E_INVALID_REQUEST | The object is not ready. You must call CreateSession or RecreateSession first. |

You may also get other NetShow specific error return value. Please check nserror.h.

The invention in which an exclusive right is claimed is defined by the following:

1. A method for recording a live presentation including a predefined content portion that includes a plurality of presentation slides displayed in response to slide triggering events during the live presentation, and a live portion with live audio and/or visual content performed in conjunction with display of said plurality of presentation slides during the live presentation, the method comprising the steps of:

(a) generating slide display commands corresponding to said slide triggering events captured in real time during the presentation when presented live, for controlling display of said plurality of presentation slides during playback of a recorded presentation;

(b) automatically embedding the slide display commands into a data stream as the data stream is produced, the data stream comprising data corresponding to the live portion of the presentation, wherein the live content is captured as a plurality of video frames comprising a plurality of keyframes and deltaframes;

(c) automatically time indexing the plurality of keyframes and deltaframes as the live content is captured to enable synchronization of the slide display commands with the live content; and (d) saving the data stream with embedded slide display commands to a file such that when the file is played, said live portion is reproduced and said plurality of presentation slides are displayed in substantial synchrony with said live portion as it is played, thereby replicating the live presentation.

2. The method of claim 1, wherein the live portion is captured as it is performed during the live presentation, further comprising the step of encoding the live portion into a digital streaming format, thereby producing the data stream.

3. The method of claim 2, wherein the step of automatically embedding the slide display commands comprises the step of interleaving the slide display commands into the data stream as the slide display commands are generated.

4. The method of claim 2, wherein the live presentation is performed using a local computer that generates the slide display commands in response to the slide triggering events; and wherein the live portion of the live presentation is captured and encoded into the data stream using an encoding computer linked in communication with the local computer, further comprising the steps of:

(a) communicating the slide display commands from the local computer to the encoding computer; and (b) interleaving the slide display commands into the data stream as they are received by the encoding computer.

5. The method of claim 1, wherein the step of automatically time indexing the plurality of keyframes and deltaframes comprises the steps of:

(a) adding a plurality of time index values to the data stream;

(b) indexing each of said plurality of keyframes to a corresponding time index value based on the time stamp of the keyframe; and (c) indexing each slide display command to a nearest preceding keyframe time index value based on a time stamp of the slide display command.

6. The method of claim 1, wherein the step generating slide display commands comprises the steps of:

(a) capturing the slide triggering events as they occur during the live presentation; and (b) generating slide display commands based on the slide triggering events that are captured.

7. The method of claim 1, wherein each presentation slide is associated with a slide file that is saved to a predetermined location, and at least one of the slide display commands references the predetermined location of an associated slide file.

8. A method for reproducing on a viewing computer a presentation that was previously presented live, said viewing computer having a display, said presentation including a predefined content portion with a plurality of presentation slides that were displayed in response to slide triggering events during the presentation when it was presented live, and a live portion comprising live audio and/or visual content performed in conjunction with display of said plurality of presentation slides during the presentation when it was presented live, the method comprising the steps of:

(a) producing a recording of the presentation when it was presented live by performing the steps of:

(i) producing a data stream comprising data corresponding to the live portion of the presentation, wherein the live portion of the presentation is captured as a plurality of video frames comprising a plurality of keyframes and deltaframes;

(ii) generating slide display commands corresponding to said slide triggering events captured in real time during the presentation when presented live, each slide display command controlling display of an associated presentation slide when the recording is played;

(iii) automatically including the slide display commands with the data corresponding to the live portion of the presentation in the data stream as the data stream is being produced, said slide display commands being automatically time indexed in regard to the keyframes and deltafranes within the data stream based upon the time when the slide triggering events occurred in the presentation when presented live; and (iv) saving the data stream to a data stream file that is accessible by the viewing computer;

(b) saving the predefined content portion to at least one presentation slide file that is accessible by the viewing computer;

(c) accessing the data stream file with the viewing computer;

(d) reproducing the live portion of the presentation on the display of the viewing computer by playing the data stream file;

(e) extracting the slide display commands from the data stream as the slide display commands are encountered while playing the data stream file;

(f) in response to each slide display command that is extracted in the preceding step, accessing data corresponding to its associated presentation slide with the viewing computer; and (g) reproducing each of the plurality of presentation slides on the display of the viewing computer as data corresponding to that presentation slide is accessed by the viewing computer in the preceding step, so that when the presentation is reproduced, the associated presentation slide is displayed at substantially an identical time relative to when displayed during the live portion of the presentation when presented live.

9. The method of claim 8, wherein the viewing computer accesses the data corresponding to the presentation slides with a browser program.

10. The method of claim 9, wherein each of said plurality of presentation slides is associated with a corresponding HTML slide file that is saved to a predetermined location on a network accessible by the viewing computer and at least a portion of said slide display commands comprise a link to the predetermined location of an associated HTML slide file on the network, each of said HTML slide files being opened in the browser program in response to its associated slide display command, said browser program interpreting the HTML slide files to reproduce said plurality of presentation slides.

11. The method of claim 10, wherein the link to each HTML slide files comprises an absolute reference to a location on the network at which the HTML slide file corresponding to the link is stored.

12. The method of claim 11, wherein each of the absolute references comprises a base portion identifying a base directory on a network resource in or below which the HTML slide files are stored, and a relative portion, identifying a location at which the HTML slide files are stored relative to the base directory, further comprising the steps of:
   (a) passing the base portion to the browser program to indicate a location of the base directory;
   (b) removing the base portion from each of the links in said slide display commands so as leave only the relative portion of the link; and
   (c) using the relative portion of each link to enable the browser program to access the HTML file associated with that link.

13. The method of claim 9, wherein the browser program includes a display area having a primary frame, and a secondary frame, a media player screen appearing in the secondary frame, said presentation slide files being reproduced in the primary frame, and said live visual content being reproduced in the media player screen.

14. The method of claim 13, further comprising the steps of:
   (a) indicating a location at which the data stream file is stored to the viewing computer;
   (b) directing the data stream to the secondary frame; and
   (c) playing the data stream in the secondary frame after at least a portion of the data stream file is received, to reproduce the live portion of the presentation.

15. A system for recording a live presentation including a predefined content portion having a plurality of presentation slides that are displayed in response to slide triggering events during the live presentation, and a live portion with live audio and/or visual content performed in conjunction with display of said plurality of presentation slides during the live presentation, the system comprising:
   (a) a local computer having a memory in which a plurality of machine instructions are stored, a user interface, and a processor coupled to the memory for executing the machine instructions;
   (b) a presentation application program comprising a portion of the plurality of machine instructions stored in the memory of the local computer, the presentation application program enabling:
      (i) a presenter to change slides during the live presentation in response to slide triggering events entered through the user interface; and
      (ii) slide display commands to be generated in response to the slide triggering events;
   (c) an audio capture subsystem that produces a digital audio signal corresponding to the live audio content; and
   (d) an encoding application module comprising a portion of the plurality of machine instructions stored in the memory of the local computer, said encoding application module being used for:
      (i) encoding the digital audio signal into a data stream having a streaming data format;
      (ii) automatically including the slide display commands with the digital audio signal in the data stream as the digital audio signal is encoded into the data stream, said data stream being automatically time indexed to enable synchronization of the slide display commands with the digital audio signal; and
      (iii) saving the data stream to a data stream file such that when the data stream file is played, said audio content is reproduced, and said plurality of presentation slides are displayed in substantial synchrony with said audio content as it is reproduced, thereby replicating the live presentation and a timing with which the presentation slides were displayed during the live presentation in connection with the live audio content.

16. The system of claim 15, wherein the live portion of the live presentation further comprises live visual content, further including a video capture subsystem that produces a digital video signal corresponding the live visual content, whereby the digital video signal is encoded along with the digital audio signal into the data stream, such that the audio and visual content is reproduced in synchrony when the data stream file is played.

17. The system of claim 16, wherein the live visual content is captured as a plurality of video frames, each being encoded into the data stream with a corresponding time stamp, and the slide display commands are interleaved into the data stream, such that each slide display command has a relative time stamp based on its location in the data stream.

18. The system of claim 17, wherein the plurality of video frames comprises a plurality of keyframes and deltaframes, and the encoding module further performs the functions of:
   (a) adding a plurality of time index values to the data stream;
   (b) indexing each of said plurality of keyframes to a corresponding time index value, based on a timestamp of the keyframe; and
   (c) indexing each slide display command to a nearest preceding keyframe time index value, based on a time stamp of the slide display command.

19. A system for recording a live presentation including a predefined content portion having a plurality of presentation slides that are displayed in response to slide triggering events during the live presentation, and a live portion comprising live audio content performed in conjunction with display of said plurality of presentation slides during the live presentation, the system comprising:
   (a) a local computer having a memory in which a plurality of machine instructions are stored, a user interface, and a processor coupled to the memory for executing the machine instructions;
   (b) an audio capture subsystem that produces a digital audio signal corresponding to the live audio content;
   (c) an encoding computer having a memory in which a plurality of machine instructions are stored, and a processor coupled to the memory for executing the machine instructions, the encoding computer being linked in communication with the local computer and the audio capture subsystem;
   (d) a portion of the plurality of machine instructions stored in the memory of the encoding computer comprising an encoding module, execution of the encoding module performing the functions of:
      (i) encoding the digital audio signal into a data stream having a streaming data format, said data stream being automatically time indexed to enable synchronization of the slide display commands with the digital audio signal; and
      (ii) saving the data stream to a data stream file; and
   (e) a presentation application program comprising a portion of the plurality of machine instructions stored in the memory of the local computer, execution of the presentation application program enabling:

(i) a presenter to change slides during the live presentation by entering slide triggering events through the user interface;

(ii) slide display commands to be generated in response to the slide triggering events; and (iii) communication of the slide display commands to the encoding computer, said slide display commands being automatically included in the data stream with the encoded digital audio signal by the encoding module as the slide display commands are received by the encoding computer and as the digital audio signal is encoded into the data stream, such that when the data stream file is played, so that said audio content is reproduced and said plurality of presentation slides are displayed in substantial synchrony with said audio content as it is reproduced, thereby replicating the live presentation and the timing of the presentation slides being displayed in connection with the audio content.

20. The system of claim 19, wherein the live portion of the live presentation further comprises live visual content, further including a video capture subsystem that produces a digital video signal corresponding to the live visual content, said digital video signal being encoded into the data stream by the encoding module executing on the encoding computer, such that the audio content and visual content are reproduced in synchrony when the data stream file is played.

21. The system of claim 20, wherein the live visual content is captured as a plurality of video frames, each being encoded into the data stream with a corresponding time stamp, and wherein the slide display commands are interleaved into the data stream, such that each slide display command has a relative time stamp based on its location in the data stream.

22. The system of claim 21, wherein the plurality of video frames comprises a plurality of keyframes and deltaframes, and the encoding module further performs the functions of:

(a) adding a plurality of time index values to the data stream;

(b) indexing each of said plurality of keyframes to a corresponding time index value, based on a time stamp of the keyframe; and (c) indexing each slide display command to a nearest preceding keyframe time index value, based on a time stamp of the slide display command.

23. A computer-readable medium having computer-executable instructions for recording a live presentation having a predefined content portion that includes a plurality of presentation slides displayed on a computer in response to slide triggering events during the live presentation, and a live portion comprising live audio and/or visual content performed in conjunction with display of said plurality of presentation slides during the live presentation, execution of the computer-executable instructions causing a computer to:

(a) generate slide display commands corresponding to said slide triggering events captured in real time during the presentation when presented live, for controlling display of said plurality of presentation slides during playback of a recorded presentation;

(b) automatically embed the slide display commands into a data stream as the data stream is produced, the data stream comprising data corresponding to the live portion of the presentation automatically indexed with timing to ensure that the slide display commands are synchronized with the audio and/or visual content as performed in the light presentation; and (c) save the data stream with embedded slide display commands to a file, such that when the file is played, said live portion is reproduced and such that said plurality of presentation slides are displayed in substantial synchrony with said live portion, thereby replicating the live presentation and display of said plurality of presentation slides.

24. The computer-readable medium of claim 23, wherein execution of the computer-executable instructions further cause the live portion to be captured as it is performed during the live presentation and to be encoded into a digital streaming format.

25. The computer-readable medium of claim 24, wherein the slide display commands are interleaved into the data stream as the slide display commands are generated.

26. The computer-readable medium of claim 24, wherein the live visual content is captured as a plurality of video frames, each being encoded into the data stream with a corresponding time stamp, and the slide display commands are interleaved into the data stream such that each slide display command has a relative time stamp based on its location in the data stream.

27. The computer-readable medium of claim 24, wherein the plurality of video frames comprises a plurality of keyframes and deltaframes, execution of the computer-executable instructions causing a computer to:

(a) add a plurality of time index values to the data stream;

(b) index each of said plurality of keyframes to a corresponding time index value, based on a timestamp of the keyframe; and (c) index each slide display command to a nearest preceding keyframe time index value, based on a time stamp of the slide display command.

28. The computer-readable medium of claim 23, wherein:

(a) the slide triggering events are captured as they occur during the live presentation;

(b) the slide display commands are generated based on the slide triggering events that are captured.

* * * * *

UNITED STATES PATENT AND TRADEMARK OFFICE
CERTIFICATE OF CORRECTION

| | | |
|---|---|---|
| PATENT NO. | : 7,330,875 B1 | Page 1 of 1 |
| APPLICATION NO. | : 09/533049 | |
| DATED | : February 12, 2008 | |
| INVENTOR(S) | : Shashank Mohan Parasnis et al. | |

It is certified that error appears in the above-identified patent and that said Letters Patent is hereby corrected as shown below:

In column 44, line 25, in Claim 8, delete "deltafranes" and insert -- deltaframes --, therefor.

Signed and Sealed this

Fifteenth Day of February, 2011

David J. Kappos
*Director of the United States Patent and Trademark Office*